(12) United States Patent
Takagi et al.

(10) Patent No.: US 7,895,710 B2
(45) Date of Patent: Mar. 1, 2011

(54) HINGE DEVICE

(75) Inventors: Hisamitsu Takagi, Kawasaki (JP);
Shinichiro Koshikawa, Yokaichiba (JP);
Kei Tsuruoka, Togane (JP); Ryo Niimi,
Togane (JP)

(73) Assignees: Fujitsu Limited, Kawasaki-Shi (JP);
Sugatsune Kogyo Co., Ltd., Tokyo (JP)

( * ) Notice: Subject to any disclaimer, the term of this patent is extended or adjusted under 35 U.S.C. 154(b) by 115 days.

(21) Appl. No.: 10/565,566

(22) PCT Filed: Jul. 20, 2004

(86) PCT No.: PCT/JP2004/010289
§ 371 (c)(1),
(2), (4) Date: Jan. 23, 2006

(87) PCT Pub. No.: WO2005/008082
PCT Pub. Date: Jan. 27, 2005

(65) Prior Publication Data
US 2006/0174443 A1    Aug. 10, 2006

(30) Foreign Application Priority Data
Jul. 23, 2003    (JP) .............................. 2003-200177

(51) Int. Cl.
E05D 11/10    (2006.01)
(52) U.S. Cl. ............................. 16/330; 16/303; 16/312; 16/316
(58) Field of Classification Search .................. 16/297, 16/338–340, 342, 277, 324, 326, 303, 330, 16/327, 328, 312, 316; 361/680–683, 679.06, 361/679.07, 679.11, 679.12, 679.15, 679.16, 361/679.2, 679.27, 679.28; 455/90.3, 575.1, 455/575.3; 379/433.13
See application file for complete search history.

(56) References Cited

U.S. PATENT DOCUMENTS
5,906,010 A    5/1999    Suzuki
(Continued)

FOREIGN PATENT DOCUMENTS
AU    1544199    8/1999
(Continued)

OTHER PUBLICATIONS
International Search Report for PCT/JP2004/010289 dated Sep. 7, 2004 (2 pages).
(Continued)

*Primary Examiner*—Victor Batson
*Assistant Examiner*—Jeffrey O'Brien
(74) *Attorney, Agent, or Firm*—Osha • Liang LLP

(57) ABSTRACT

A movable member (not shown) non-turnably connected to a second hinge member is arranged on the turning axial line of first and second hinge members such that the movable member is turnable and movable in the direction of the turning axial line. The movable member is biased toward the first hinge member by a coiled spring (not shown). A confronting surface of the first hinge member with respect to the movable member is provided with a pair of raised wall surfaces 11*d*, 11*d* extending in the direction of the turning axial line and end face cams 41 arranged between the pair of raised wall parts 11*d*, 11*d*, respectively. A confronting surface of the movable member with respect to the first hinge member is provided with a pair of abutment arm parts 42*a* for converting the biasing force of the coiled spring to a turn biasing force for turning the movable member by being press-contacted with the end face cam 41. A recess 11*e* is formed in a lower part of the raised wall surface 11*d*. A side surface of a lower side of this recess 11*e* is provided as a part of the end face cam 41.

3 Claims, 14 Drawing Sheets

U.S. PATENT DOCUMENTS

| | | | |
|---|---|---|---|
| 5,923,751 A * | 7/1999 | Ohtsuka et al. | 379/433.13 |
| 6,148,480 A | 11/2000 | Cooke | |
| 6,459,887 B2 * | 10/2002 | Okuda | 455/90.1 |
| 6,658,111 B2 | 12/2003 | Nagashima | |
| 6,658,699 B2 * | 12/2003 | Huong | 16/330 |
| 6,886,221 B2 * | 5/2005 | Minami et al. | 16/324 |
| 6,952,860 B2 * | 10/2005 | Kawamoto | 16/285 |
| 6,985,580 B2 * | 1/2006 | Lu et al. | 379/433.13 |
| 7,007,345 B2 * | 3/2006 | Nakase et al. | 16/330 |
| 7,017,233 B2 * | 3/2006 | Hsu et al. | 16/324 |
| 7,027,294 B2 * | 4/2006 | Kato | 361/679 |
| 2001/0016474 A1 | 8/2001 | Nagashima | |
| 2005/0220294 A1 * | 10/2005 | Gupte | 379/433.13 |

FOREIGN PATENT DOCUMENTS

| | | |
|---|---|---|
| CA | 1319978 | 7/1993 |
| GB | 2334068 | 8/1999 |
| JP | 10-248757 | 9/1998 |
| JP | 11-341130 | 12/1999 |
| JP | 2001-207721 | 8/2001 |
| JP | 2003-184859 | 7/2003 |
| TW | 495123 | 7/2002 |
| WO | WO-03/044380 | 5/2003 |

OTHER PUBLICATIONS

Patent Abstracts of Japan 2003-184859 dated Jul. 3, 2003 (1 page).
Patent Abstracts of Japan 10-248757 dated Sep. 22, 1998 (1 page).
Patent Abstracts of Japan 11-341130 dated Dec. 10, 1999 (1 page).
Patent Abstracts of Japan 2001-207721 published Aug. 3, 2001 (1 page).

* cited by examiner

folding position    talking position (B)

(C)

HINGE DEVICE

TECHNICAL FIELD

This invention relates to a hinge apparatus which is not only capable of merely turnably connecting two articles such as a transmission section and a reception section of a cellular telephone set but also capable of turning one article relative to the other article.

BACKGROUND ART

In general, hinge apparatuses of this type comprise first and second hinge members turnably connected to each other, a movable member arranged on the turning axial line of the first and second hinge members such that the movable member is turnable and movable in the direction of the turning axial line, and a biasing means for biasing this movable member toward the first hinge member. A pair of end face cams extending in the peripheral direction about the turning axial line are formed on the opposing surface of the first hinge member with respect to the movable member, and a raised wall surface extending in a direction of the turning axial line is formed between the pair of end face cams. On the other hand, a pair of abutment parts are formed on the confronting surface of the movable member with respect to the first hinge member. The respective abutment parts are press-contacted with the pair of end face cams by a biasing means and adapted to co-act with the pair of end face cams to convert the biasing force of the biasing means to a turn biasing force. The movable member is turned by this turn biasing force. When the moveable member is turned, the abutment part is slid down along the end face cam toward the terminal end from the starting end of the end face cam (for example, see Patent Document 1).

Patent Document 1: Japanese Patent Application Laid-Open No. 2001-207721

DISCLOSURE OF THE INVENTION

Problem to be Solved by the Invention

In the above-mentioned conventional hinge apparatus, when the abutment part is abutted with the raised wall surface, the movable member becomes unable to move any further. Because of this limitation, the turning range of the second hinge member is obliged to be reduced with respect to the first hinge member, and cannot be made larger than 180 degrees.

Means for Solving the Problem

The present invention has been made in order to solve the above-mentioned problem. According to the present invention, there is provided a hinge apparatus comprising a first hinge member, a second hinge member turnably connected to the first hinge member, a movable member arranged on the turning axial line of the first and second hinge members in such a manner as to be turnable about the turning axial line and movable in the direction of the turning axial line, and a biasing means adapted to bias the movable member toward the first hinge member, one of confronting surfaces of the first hinge member and the movable member being provided with a plurality of end face cams in such a manner as to extend in the peripheral direction about the turning axial line and equally spacedly arranged in the peripheral direction about the turning axial line, and a raised wall surface in such a manner as to extend in the direction of the turning axial line and to be disposed between two of the end face cams which are adjacent in the peripheral direction, the other of the confronting surfaces of the first hinge member and the movable member being provided with a pair of abutment parts in such a manner as to be urged against the pair of end face cams by the biasing force of the biasing means and adapted to co-act with the pair of end face cams to convert the biasing force of the biasing means to a turn biasing force for turning the second hinge member through the movable member, a recess being formed in said raised wall and arranged on an extension of said end face cam.

In the above-mentioned arrangement, one side surface of the recess desirously forms a part of the end face cam.

It is also desirous that the end face cam has a length of 180 degrees or more in the peripheral direction.

Advantageous Effect of the Invention

According to the present invention, the turning range of the second hinge member with respect to the first hinge member can be set to180 degrees or more.

BEST MODE FOR CARRYING OUT THE INVENTION

One embodiment of the present invention will be described hereinafter with reference to FIGS. 1 through 15.

FIG. 1 shows a cellular telephone set 1 in which a hinge apparatus 10 (see FIGS. 2 and 3) according to the present invention is used. This cellular telephone set 1 includes a transmission section 2 and a reception section 3. The transmission section 2 and the reception section 3 are turnably connected to each other through a turning axial line L. That is, two connection cylindrical parts 2*a* as a connection part are provided on the end part on the side of the reception section 3 of the transmission section 2. The two connection cylindrical parts 2*a* are disposed such that their axes are aligned with the turning axial line L and arranged on both end parts in a direction of the turning axial line L of the transmission section 2. Two connection shaft parts 3*a* as a connection part are provided on an end part on the side of the transmission section 2 of the reception section 3. The two connection shaft parts 3*a* are arranged such that their axes are aligned with the turning axial line L. Moreover, one of the connection shaft parts 3*a* is arranged in such a manner as to be in almost contact with the inner end face of the corresponding one of the connection cylindrical parts 2*a*, and the other connection shaft part 3*a* is arranged in such a manner as to be in almost contact with the inner end face of the other connection cylindrical part 2*a*. Of the mutually adjacent two sets of connection cylindrical parts 2*a* and the connection shaft parts 3*a*, one set of the connection cylindrical part 2*a* and the connection shaft part 3*a* which are arranged on the left side in FIG. 1(A) is turnably connected by the hinge apparatus 10 according to the present invention. The other-one set of connection cylindrical part 2*a* and the connection shaft part 3*a* are merely turnably connected to each other through a known hinge apparatus (not shown). By turnably connecting the connection cylindrical part 2*a* and the connection shaft part 3*a* together, the transmission section 2 and the reception section 3 are turnably connected to each other about the turning axial line L. In the description to follow, the transmission section 2 is fixed and the reception section 3 is turnable relative to the transmission section 2 just for the sake of convenience of explanation.

The reception section 3 is turnable between a folding position and a talking position relative to the transmission section 2. The folding position is restricted by abutment of a front surface 3b of the reception section 3 with a front surface 2b of the transmission section 2. The talking position is restricted by abutment of a stopper (not shown) provided at the end part on the transmission section 2 side of the reception section 3 with the end part on the reception section 3 side of the transmission section 2. In this embodiment, as shown in FIG. 1(B), the talking position is established to a position 160 degrees away from the folding position. The stopper, which restricts the talking position of the reception section 3, may be provided at the end part on the reception section 3 side of the transmission section 2, so that the talking position can be restricted by abutment of this stopper with the end part on the transmission section 2 side of the reception section 3.

The hinge apparatus 10 according to the present invention will be described next. Before describing the hinge apparatus 10, its operation will roughly be described. Suppose that the reception section 3 is currently located in the folding position. In that state, when a control button 61 of the hinge apparatus 10 is depressed, the reception section 3 is automatically turned to the talking position from the folding position and kept in the talking position by a turn biasing force of the hinge apparatus 10. The reception section 3 turned to the talking position is manually turned toward the folding position. In the process of the foregoing operation, the reception section 3 is turned toward the folding position against the turn biasing force of the hinge apparatus 10 until the reception section 3 is turned to a position located before the folding position by a predetermined angle (10 degrees in this embodiment). However, when the reception section 3 is turned to the position located before the folding position by 10 degrees, the reception section 3 is turn biased toward the folding position by the hinge apparatus 10. The reception section 3 is turned to the folding position and kept in the folding position by this turn biasing force.

The reception section 3 can also manually be turned to the talking position from the folding position. In case the reception section 3 is manually turned toward the talking position from the folding position, when the reception section 3 is located somewhere between the folding position and a position located by a predetermined angle (15 degrees in this embodiment) away from the folding position toward the talking position, the reception section 3 is biased toward the folding position from the talking position by the hinge apparatus 10. Accordingly, in this angle range of 15 degrees, the reception section 3 is turned toward the talking position from the folding position against the turn biasing force of the hinge apparatus 10. Of course, in this angle range of 15 degrees, if the reception section 3 is left in a freely turnable state, the reception section 3 is returned to the folding position by the hinge apparatus 10. When the reception section 3 is located somewhere in a range (this range shall hereinafter be referred to as the "stoppable range") between the position 15 degrees away from the folding position toward the talking position and the position away by a predetermined angle (15 degrees in this embodiment) from the talking position toward the folding position, if any attempt should be made to turn the reception section 3 toward the talking position, a frictional resistance (prohibiting force) for prohibiting the reception section 3 from turning would be generated within the hinge apparatus 10. Accordingly, in this stoppable range, the reception section 3 is turned toward the talking position against the frictional resistance generated within the hinge apparatus 10. Moreover, in the stoppable range, the reception section 3 can be stopped at any optional position by the frictional resistance generated within the hinge apparatus 10. When the reception section 3 is turned to the position located before the talking position by 15 degrees, the reception section 3 is turned to the talking position and kept in this talking position by the turn biasing force of the hinge apparatus 10 directed toward the talking position.

In case the reception section 3 manually turned to the talking position is manually turned to the folding position, when the reception section 3 is located somewhere between the talking position and the position located by 15 degrees away from that position toward the folding position, the reception section 3 is turned toward the folding position against the turn biasing force of the hinge apparatus 10. Accordingly, in this angle range, if the reception section 3 is left in a freely turnable state, the reception section 3 is returned to the talking position by the turn biasing force of the hinge apparatus 10. When the reception section 3 is located in the stoppable range, the reception section 3 can be turned against the frictional resistance acting on the interior of the hinge apparatus 10 and stopped in any optional position by the frictional resistance as in the case with the case where the reception section 3 is turned toward the talking position from the folding position. Accordingly, in the stoppable range, when the reception section 3 is turned either in a direction toward the folding position or in a direction toward the talking position, the reception section 3 is turned against the frictional resistance acting on the hinge apparatus 10. Moreover, the reception section 3 can be stopped in any optional position by the frictional resistance. When the reception section 3 reaches the position 15 degrees before the folding position, the reception section 3 is turned to the folding position and kept in the folding position by the turn biasing force of the hinge apparatus 10 directed toward the folding position.

Next, the specific construction of the hinge apparatus 10 which is operated in the manner as mentioned above will be described. First, the one-set of the connection cylindrical part 2a and the connection shaft part 3a with which the hinge apparatus 10 is incorporated will be preliminarily described. The connection cylindrical part 2a is, as shown in FIGS. 2 through 5, formed as a circular cylindrical body whose two ends are open and whose interior serves as a first connection hole 2c. The first connection hole 2c is formed in such a manner as to align its axis with the turning axial line L, and it includes an inner (connection shaft part 3a side) enlarged-diameter hole part 2d and an outer reduced-diameter hole part 2e. A pair of keys 2f projecting inward are formed in the inner peripheral surface of the reduced-diameter hole part 2e and arranged on the end part of the reduced-diameter hole 2e on the enlarged-diameter hole part 2d side. The end face on the enlarged-diameter hole part 2d side of the key part 2f and the bottom surface of the enlarged-diameter hole part 2d constitute the same plane serving as an abutment surface 2g. A right angle is formed between the abutment surface 2g and the turning axial line L.

As shown in FIGS. 2 through 4 and FIG. 6, a second connection hole 3c is formed in the confronting surface with respect to the connection cylindrical part 2a of the connection shaft part 3a. The second connection hole 3c is defined as a blind hole having a shallow depth. The end part on the connection cylindrical part 2a of the second connection hole 3c is open and the end part on its reverse side is closed. Of course, the second connection hole 3c may be defined as a through-hole passing through the connection shaft part 3a as in the case with the first connection hole 2c. In case the second connection hole 3c is defined as a through-hole, however, it is desirous that a stopper for prohibiting a stationary circular plate 12, which will be described later, from inserting into the through-hole exceeding a portion equal to the depth of the second connection hole 3c is formed on the inner peripheral surface of the through-hole. The second connection hole 3c is formed such that its axis is aligned with the turning axial line L. A key part 3d extending in parallel with the turning axial line L is formed on the inner peripheral surface of the second connection hole 3c.

The hinge apparatus 10, as shown in FIGS. 2 and 3, comprises a stationary cylinder (first hinge member) 11, a stationary circular plate (second hinge member) 12 and a hinge shaft 13. The stationary cylinder 11, as shown in FIGS. 7 and 8, includes an enlarged-diameter cylindrical part 11a and a reduced-diameter cylindrical part 11b the axes of which are aligned to each other. The enlarged-diameter cylindrical part 11a is fitted to the enlarged-diameter hole part 2d through a cover cylinder 15 which will be described later. The enlarged-diameter cylindrical part 11a is inserted into the enlarged-diameter hole part 2d through the opening part on the connection shaft part 3a side and abutted with an abutment surface 2g through a cover cylinder 15. Accordingly, the stationary cylinder 11 is prohibited from moving outward (toward the first connection hole 2c from the second connection hole 3c) by the abutment surface 2g. Moreover, the stationary cylinder 11 is not substantially moved inward either, in a state where the hinge apparatus 10 is mounted on the cellular telephone set 1. Accordingly, the stationary cylinder 11 is actually non-movable in the direction of the turning axial line L with respect to the first connection hole 2c. The reduced-diameter cylindrical part 11b is fitted to the reduced-diameter hole part 2e. A key groove 11c is formed at the outer peripheral surface of the reduced-diameter cylindrical part 11b and a key part 2f is fitted into this key groove 11c. Owing to this arrangement, the stationary cylinder 11 is non-turnably connected to the transmission section 2. Accordingly, since it is assumed here that the transmission section 2 is fixed, the stationary cylinder 11 is also fixed.

As shown in FIGS. 2 and 3, the stationary circular plate 12 is withdrawably inserted into the second connection hole 3c. As shown in FIGS. 7 and 13, a key groove 12a is formed in the outer peripheral surface of the stationary circular plate 12. By fitting the key part 3d into this key groove 12a, the stationary circular plate 12 is non-turnably connected to the connection shaft 3a and thus, non-turnably connected to the reception section 3. Accordingly, the stationary circular plate 12 is turned in unison with the reception section 3. Thus, the turning position of the stationary circular plate 12 at the time the reception section 3 is located in the folding position is also referred to as the "folding position", and the turning position of the stationary circular position at the time the reception section 3 is located in the talking position is also referred to as the "talking position". Although the stationary circular plate 12 is fitted into the second connection hole 3c such that the stationary circular plate 12 is movable in the direction of the turning axial line L, the stationary circular plate 12 is abutted with the bottom surface of the second connection hole 3c and positionally fixed when the hinge apparatus 10 is incorporated with the connection cylindrical part 2a and the connection shaft part 3a, and thus, the stationary circular plate 12 is never moved in the direction of the turning axial line L within the second connection hole 3c. The thickness of the stationary circular plate 12 is set to be generally equal to the depth of the second connection hole 3c, and the end face on the connection cylindrical part 2a of the stationary circular plate 12 is located on the generally same plane as the end face confronting the connection cylindrical part 2a of the connection shaft part 3a.

The hinge shaft 13 is arranged in such a manner as to align its axis with the turning axial line L and passed through the stationary cylinder 11 and the stationary circular plate 12. A head part 13a is formed on one end part (right end part in FIGS. 2 and 3) of the hinge shaft 13. This head part 13a is non-turnably engaged with an engagement recess 12b which is formed in the end face of the stationary circular plate 12 confronting the bottom surface of the second connection hole 3c. Accordingly, the hinge shaft 13 is turned in unison with the stationary circular plate 12. The hinge shaft 13 is turnably fitted to the stationary cylinder 11. As a result, the stationary cylinder 11 and the stationary circular plate 12 are turnably connected to each other through the hinge shaft 13, and thus, the connection cylindrical part 2a and the connection shaft part 3a are turnably connected to each other, and also the transmission section 2 and the reception section 3 are turnably connected to each other. The head part 13a of the hinge shaft 13 is sandwichingly held by the bottom surface of the engagement recess 12a of the stationary circular plate 12 and the bottom surface of the engagement hole 3c of the connection shaft part 3a in a state that the hinge apparatus 10 is incorporated with the first and second connection holes 2c, 3c. Accordingly, in this embodiment, the hinge shaft 13 behaves in unison with the stationary circular plate 12. Thus, the hinge shaft 13 may be integrally formed with the stationary circular plate 12. In contrast, in case the hinge shaft 13 is formed separately from the stationary circular plate 12 as in this embodiment, it is accepted that the hinge shaft 13 is non-turnably fitted to the stationary cinder 11 and turnably fitted to the stationary plate 12 as long as the hinge shaft 13 is fitted to the stationary cylinder 11 such that the hinge shaft 13 is movable in the direction of the turning axial line L.

The hinge shaft 13 is provided at the other end part (left end part in FIGS. 2 and 3) with a stop ring 14. By this stop ring 14, the stationary cylinder 11 is prevented from escaping leftward from the other end part of the hinge shaft 13. Moreover, as mentioned above, the stationary circular plate 12 is prohibited from escaping rightward from the hinge shaft 13 by the head part 13a. Accordingly, the stationary cylinder 11 and the stationary circular plate 12 are prevented from escaping from the hinge shaft 13. As a result, various members such as a coiled spring 22, etc. as later described, which are arranged between the stationary cylinder 11 and the stationary circular plate 12, are mounted on the hinge shaft 13 such that they are also prevented from escaping from the hinge shaft 13. Owing to this arrangement, the entire hinge apparatus 10 formed as a unit.

As mentioned above, the hinge apparatus 10 is designed such that the reception section 3 can be turned automatically or manually. Thus, the construction for manually turning the reception section 3 will be described first.

A turnable member 21 is turnably and slidably externally fitted to the outer periphery of the hinge shaft 13 between the stationary cylinder 11 and the stationary circular plate 12. This turnable member 21 is arranged in opposing relation to and proximate to the stationary circular plate 12. The turnable member 21 is biased toward the stationary circular plate 12 by a coiled spring (biasing means) 22. Moreover, the turnable member 21 is non-turnably connected to the stationary cylinder 11 unless the locked state of a lock means 50, which will be described later, is released, and the locked state of the lock means 50 is not released as long as the reception section 3 is manually turned. Accordingly, in case the reception section 3 is manually turned, the turnable member 21 maintains a stopped state and the stationary circular plate 12 is turned relative to the turnable member 21.

As shown in FIG. 13, a pair of cam recesses 23A, 23B are formed in the confronting surface of the stationary circular plate 12 with respect to the turnable member 21. The pair of recesses 23A, 23B are arranged 180 degrees away from each other on a circumference about the center of the turning axial line L. That is, they are symmetrically arranged with respect to the center of the turning axial line L. Moreover, the pair of recesses 23A, 23B are formed in the same configuration. Hence, only the cam recess 23A will be described. The cam recess 23A is formed in an elliptical configuration long in the peripheral direction. The depth of the cam recess 23A is, as shown in FIG. 14, progressively increased from the opposite end parts in the peripheral direction about the turning axial line L toward the center. Moreover, the depth of the cam recess 23A is increased at a specific ratio excluding a small part of each end and a central part. In other words, the bottom surface, which defines the cam recess 23A, includes one end side inclination part 23a and the other end side inclination part 23b which are inclined at a specific angle between the opposite end parts in the peripheral direction about the center of the turning axial line L and the central part. The-one end side inclination part 23a and the other end side inclination part 23b are mutually reversely inclined but their inclination angles are same, namely, they are set to an angle α. The-one end side inclination part 23a is located on the folding position side with respect to the center of the cam recess 23A, while the other end side inclination part 23b is located on the talking position side.

A pair of spherical bodies 24A, 24B, which are made of a hard material such as metal, are, as shown in FIG. 12, fixedly embedded in the confronting surface of the turnable member 21 with respect to the stationary circular plate 12 such that the pair of spherical bodies 24A, 24B are partly protruded (protrusion parts) toward the stationary circular plate 12. Instead of the pair of spherical bodies 24A, 24B, protrusion parts having such a configuration as to correspond to the protruded parts of the spherical bodies 24A, 24B protruded from the turnable member 21 may be integrally formed with the turnable member 21. The pair of spherical bodies 24A, 24B are urged against the confronting surface of the stationary circular plate 12 with respect to the turnable member 21 by the biasing force of the coiled spring (biasing means) 22 acting on the turnable member 21. It is also accepted that the pair of recesses 23A, 23B are formed in the confronting surface of the turnable member 21 with respect to the stationary circular plate 12 and the pair of spherical bodies 24A, 24B or protrusion parts are provided to the confronting surface of the stationary circular plate 12 with respect to the turnable member 21.

The pair of spherical bodies 24A, 24B are arranged 180 degrees away from each other on the same circumference as the pair of cam recesses 23A, 23B. Accordingly, the pair of spherical bodies 24A, 24B are brought in or out with respect to the pair of cam recesses 23A, 23B in accordance with the turning position of the stationary circular plate 12, i.e., the turning position of the reception section 3. When the reception section 3 is located in the folding position, the spherical body 24A (24B) is, as indicated by the imaginary line in FIG. 14, in contact with the-one end side inclination part 23a (23b) of the cam recess 23A (23B) with its center C located in a position a predetermined angle (10 degrees in this embodiment) away from the center in the peripheral direction of the recess 23A (23B) in a direction toward the folding position from the talking position. As a result, the biasing force of the coiled spring 22 is converted to a turn biasing force for turn biasing the stationary circular plate 12 in a direction (direction as indicated by an arrow A of FIG. 14) toward the folding position from the talking position, through the-one end side inclination part 23a. By this turn biasing force, the front surface 3b of the reception section 3 is abutted with the front surface 2b of the transmission section 2 and the reception section 3 is maintained in the folding position.

When the reception section 3, which is located in the folding position, is manually turned toward the talking position by a predetermined angle (15 degrees in this embodiment) against the turn biasing force of the coiled spring 22, the spherical bodies 24A, 24B are slid upward the-one end side inclination parts 23a, 23a of the cam recesses 23A, 23B and escaped from the cam recesses 23A, 23B, respectively. As a result, the biasing force of the coiled spring 22 is no more converted to the turn biasing force. In other words, only when the reception section 3 is located in an angle range between the folding position and a position 15 degrees away therefrom toward the talking position, the biasing force of the coiled spring 22 is converted to the turn biasing force for turn biasing the stationary circular plate 12 and the reception section 3 toward the folding position through the-one end side inclination parts 23a, 23a and the spherical bodies 24A, 24B.

When the spherical bodies 24A, 24B are caused to escape from the cam recesses 23A, 23B by manually turning the reception section 3 by 15 degrees from the folding position toward the talking position against the turn biasing force of the coiled spring 22, the spherical bodies 24A, 24B are brought into the above-mentioned stoppable range. Then, the spherical bodies 24A, 24B are press-contacted with the confronting surface of the stationary circular plate 12 with respect to the turnable member 21 by the biasing force of the coiled spring 22. One end face confronting the turnable member 21 of the stationary circular plate 12 within the stoppable range is a flat surface orthogonal to the turning axial line L. Accordingly, within the stoppable range, the biasing force of the coiled spring 22 is converted to a frictional resistance generated between the spherical bodies 24A, 24B and the stationary circular plate 21. This frictional resistance acts to prohibit the relative turn between the stationary circular plate 12 and the turnable member 21, and the strength thereof is properly set such that the reception section 3 can be stopped in an optional position. Of course, the reception section 3 can be turned by applying a large turning force enough to overcome the frictional resistance.

The-one end face confronting with the turnable member 21 of the stationary circular plate 12 is not necessarily required to be entirely flattened but it is good enough to arrange the part positioned on the circumference, with which the spherical bodies 24A, 24B are contacted when at least the stationary circular plate 12 is turned with respect to the turnable member 21, to be located in the same position in the direction of the turning axial line L. Although the spherical bodies 24A, 24B are fixed to the turnable member 21, they may be turnably embedded. In that case, however, it is necessary to properly set the rolling frictional resistance between the spherical bodies 24A, 24B & the turnable member 21 and the stationary circular plate 12 so that reception section 3 can be stopped in an optional position.

When the reception section 3 is turned to a position 15 degrees before the talking position, the spherical bodies 24A, 24B are respectively brought into different cam recesses, i.e., the cam recesses 23B, 23A, from the cam recesses 23A, 23B in which the spherical bodies 24A, 24B are entered, respectively, when located in the folding position. Then, the spherical bodies 24A, 24B are respectively urged against the other end side inclination parts 23b, 23b of the cam recesses 23B, 23A by the biasing force of the coiled spring 22. As a result, the stationary circular plate 12 is turn biased in a direction (direction as indicated by an arrow B of FIG. 14) toward the talking position from the folding position. By this turn biasing force, the stationary circular plate 12 and the reception part 3 are turned to the talking position. When the reception section 3 is turned to the talking position, the spherical bodies 24A, 24B are located in symmetrical positions with those positions (positions indicated by an imaginary line of FIG. 14) when the reception section 3 is located in the folding section with respect to the centers of the recesses 23B, 23A, respectively. That is, the spherical bodies 24A, 24B are located in positions 10 degrees away in the peripheral direction of the stationary circular plate 12 from the centers of the cam recesses 23B, 23A, respectively. At that time, the stationary circular plate 12 is turned by the following angle;

180 degrees−(10 degrees+10 degrees)=160 degrees from the folding position with respect to the stationary circular plate 21, the stationary cylinder 11 and the transmission section 2 and reaches the talking position. Moreover, in the talking position, since the spherical bodies 24A, 24B are abutted with the other end side inclination parts 23b, 23b, respectively, the reception section 3 is kept turn-biased in the direction toward the talking position from the folding position even after the reception section 3 reaches the talking position, and held in the talking position by this turn biasing force.

In case the reception section 3 manually turned to the talking position is to be manually turned to the folding position, the reception section 3 is turned against the turn biasing force of the coiled spring 22 and the other end side inclination part 23b within a range of 0 to 15 degrees from the talking position, and the reception section 3 is turned against the frictional resistance generated between the spherical bodies 24A, 24B and the stationary circular plate 12 within the stoppable range. When the reception section 3 reaches a position 15 degrees before the folding position, the spherical bodies 24A, 24B are brought respectively into the cam recesses 23A, 23B and contacted respectively with the-one end side inclination parts 23a, 23a. By doing so, the reception section 3 is turned to the folding position and held in the folding position.

Next, the construction for automatically turning the reception section 3 from the folding position to the talking position will be described. In case the reception section 3 is to be automatically turned, the stationary circular plate 12 and the turnable member 21 are turned in unison except when the stationary circular plate 12 is located in the folding position and in its vicinity. In order to turn the stationary circular plate 12 and the turnable member 21 in unison, a connection retaining means 20 is provided between the stationary circular plate 12 and the turnable member 21.

That is, except when the reception section 3 is located in the folding position and in its vicinity, the spherical bodies 24A, 24B are respectively aligned at their centers with the central parts of the cam recesses 23A, 23B in the peripheral direction of the stationary circular plate 12 as indicated by a solid line of FIG. 14, and the respective spherical bodies 24A, 24B are simultaneously contacted with the-one end side inclination part 23a and the other end side inclination part 23b. In that state, when the stationary circular plate 12 is to be turned in the direction as indicated by an arrow A of FIG. 14 with respect to the turnable member 21, the-one end side inclination part 23a prohibits this turn, and when the stationary circular plate 12 is to be turned in the direction as indicated by an arrow B of FIG. 14, the other end side inclination part 23b prohibits this turn. Accordingly, when the spherical bodies 24A, 24B are located in the central parts of the cam recesses 23A, 23B, respectively, the stationary circular plate 12 and the turnable member 21 are non-turnably connected to each other by a retaining force having a strength which is determined by the biasing force of the coiled spring 22 and the inclination angle α formed between the-one end side inclination part 23a and the other end side inclination part 23b. It is accepted that the-one end side inclination part 23a and the other end side inclination part 23b are not inclined at a constant inclination angle and that the inclination angle is progressively increased in the peripheral direction from the centers of the cam recesses 23A, 23B.

As shown in FIGS. 2 and 3, the hinge apparatus 10 further comprises a turn biasing means 40 for automatically turning the reception section 3 from the folding position to the talking position, a lock means 50 for locking the reception section 3 in the folding position, and an unlock means 60 for releasing the locked state caused by the lock means 50 and allowing the reception section 3 to turn toward the talking position.

First, the turn biasing means 40 will be described. As shown in FIGS. 2, 3, 7 and 8, a pair of end face cams 41, 41 extending in the peripheral direction about the turning axial line L are formed in the end face facing the stationary circular plate 12 side of the enlarged diameter cylindrical part 11a of the stationary cylinder 11. This end face cam 41 is, when viewed from the stationary circular plate 12 side, inclined in such a manner as to be spaced away from the stationary circular plate 12 from the folding position toward the talking position. The end part on the stationary circular plate 12 side of the end face cam 41 shall hereinafter be referred to as the "starting end part" and the end part on the reverse side shall hereinafter be referred to as the "rear end part". The end face cam 41 is formed such that it has a length of 180 degrees in the peripheral direction. As shown in FIG. 15, the most part of the end face cam 41 from its starting end edge (point where the cam angle is 0 in the cam diagram of FIG. 15) toward the rear end is provided as a main inclination surface part 41a, and the rear end part following this main inclination surface part 41a is provided as a gentle inclination surface 41b. The main inclination surface part 41a has a length of about 150 degrees from the starting end edge of the end face cam 41 and inclined at a constant angle β1. This inclination angle β1 is set to be smaller than the inclination angle α. The gentle inclination surface 41b is formed over the range of about 30 degrees from the rear end of the main inclination surface part 41a to the rear end edge (point where the cam angle is 180 degrees) of the end face cam 41 and inclined at a constant angle β2. This inclination angle β2 is set to be smaller than the inclination angle β1 of the main inclination surface part 41a.

Although the gentle inclination surface part 41b is intersected with the main inclination surface part 41a at an angle (β1-β2), it is desirous to smoothly connect the gentle inclination surface part 41b with the main inclination surface part 41a by forming an arcuate curved-surface between the main inclination surface part 41a and the gentle inclination surface part 41b such that the arcuate curved-surface is in contact with the main inclination surface part 41a and the gentle inclination surface part 41b. Although the gentle inclination surface part 41b is inclined at a constant angle, the inclination angle of the gentle inclination surface part 41b may be gradually reduced toward the rear end edge. In that case, it is desirous that the inclination angle of the starting end edge of the gentle inclination surface part 41b is made equal to the inclination angle of the main inclination surface part 41a and both the inclination surface parts 41a, 41b are smoothly connected to each other.

As shown in FIGS. 8 and 15, an abutment surface 41c smoothly connected to the starting end edge of the end face cam 41 is formed on the end face faced with the stationary circular plate 12 of the enlarged-diameter cylindrical part 11a. This abutment surface 41c is inclined in the same direction as the end face cam 41 but its inclination angle is set to be larger than the inclination angle α.

As mentioned above, since the end face cam 41 has a length equal to 180 degrees in terms of a converted angle in the peripheral direction, the total length in the peripheral direction of the end face cam 41 and the abutment surface 41c is longer than 180 degrees. In order to form the end face cam 41 and the abutment surface 41c which have a total length of more than 180 degrees on one end face of the enlarged-diameter cylindrical part 11a, the following construction is employed.

That is, as shown in FIGS. 8 and 15, a pair of raised wall surfaces 11d, 11d extending along the turning axial line L are formed on the end face faced with the stationary circular plate 12 of the enlarged-diameter cylindrical part 11a. The pair of raised wall surfaces 11d, 11d are arranged in such a manner as to be 180 degrees away from each other in the peripheral direction. The upper end in FIG. 15 of each raised wall surface 11d is arranged in such a manner as to be intersected with the abutment surface 41c. The end face cam 41 and the abutment surface 41c are formed between the pair of raised wall surfaces 11d, 11d. The total length in the peripheral direction of the end face cam 41 and the abutment surface 41c is longer than 180 degrees. Thus, a recess 11e is formed in a lower part of the raised wall surface 11d. At least the open side end part of one side surface (the lower side surface of FIG. 15) of the recess 11e constitutes a rear end part (a part of the gentle inclination surface part 41b) of the end face cam 41. As a result, the total length of the end face cam 41 and the abutment surface 41c can be made longer than 180 degrees.

As shown in FIGS. 2 and 3, a movable member 42 is arranged between the stationary cylinder 11 and the turnable member 21. This movable member 42 functions as a follower for the end face cam 41 and is turnably and slidably externally fitted to the hinge shaft 13. A pair of abutment arm parts (abutment parts) 42a, 42a protruding toward the stationary cylinder 11 are, as shown in FIGS. 2, 3, 7 and 11, formed on the end face confronting the end face cam 41 of the movable member 42. The tip parts of the abutment arm parts 42a, 42a are in contact with the end face cams 41, 41, respectively. When the reception section 3 is located in the folding position, the abutment arm part 42a is, as shown in FIG. 15, in contact with the starting end edge and the abutment surface 41c of the end face cam 41 (hereinafter the position of the movable member 42 at that time shall be referred to as the "initial position"), and when the reception section 3 is turned to the talking position, the abutment arm part 42a comes into contact with the end face cam 41 (gentle inclination surface part 41b) in the position 17 degrees away from the starting end edge (hereinafter, this position of the movable member 42 at that time shall be referred to as the "terminal end position").

As shown in FIGS. 2 and 3, a cylindrical part 42b extending toward the stationary circular plate 12 is formed on the movable member 42. This cylindrical part 42b is slidably and turnably fitted to the hinge shaft 13. A cylindrical part 21a is formed on the end face on the movable member 42 side of the turnable member 21. This cylindrical part 21a is non-turnably but slidably externally fitted to the cylindrical part 42b of the movable member 42. Accordingly, the turnable member 21 is relatively movable in the direction of the turning axial line L with respect to the movable member 42 but non-turnable with respect to the movable member 42. The turnable member 21 is turned in unison with the movable member 42. Thus, the position of the turnable member 21 at the time the movable member is located in the initial position shall also be referred to as the "initial position" and the position of the turnable member 21 at the time the movable member is located in the terminal end position shall also be referred to as the "terminal end position".

The coiled spring 22 is externally fitted to the outer side of the cylindrical part 21a with a small gap. One end of this coiled spring 22 is in abutment with the movable member 42 and the other end is in abutment with the turnable member 21. Accordingly, the coiled spring 22 is functioned to bias the movable member 42 toward the stationary cylinder 11 and press the abutment arm part 42a so as to contact the end face cam 41. Of course, the coiled spring 22 is, as mentioned above, also functioned to bias the turnable member 21 toward the stationary circular plate 12 and press the spherical bodies 24A, 24B so as to make them contact the stationary circular plate 12.

When the abutment arm part 42a is press contacted with the end face cam 41, the biasing force of the coiled spring 22 is converted to a turn biasing force. By this turn biasing force, the movable member 42 is turn biased from the folding position toward the talking position (from the initial position toward the terminal end position). Accordingly, if the movable member 42 is capable of freely turning and moving, the movable member 42 is turned toward the talking position and the abutment arm part 42a is slid down from the starting end part toward the rear end part along the end face cam 41. When the movable member 42 is turned, the turnable member 21 is turned together with the movable member 42.

Presume here that the reception section 3 is currently located in the folding position. At that time, the centers of the spherical bodies 24A, 24B are 10 degrees away from the centers of the cam recesses 23A, 23B in a direction (direction as indicated by an arrow A of FIG. 14) toward the folding position from the talking position, and the spherical bodies 24A, 24B are in contact with the-one end side inclination parts 23a, 23a of the cam recesses 23A, 23B, respectively. Accordingly, immediately after the turnable member 21 begins to turn from the initial position toward the talking position, the spherical bodies 24A, 24B are merely slid down toward the centers of the cam recesses 23A, 23B along the-one end side inclination parts 23a, 23a and the turnable member 21 is relatively moved (idling) toward the talking position with respect to the stationary circular plate 12. Thus, the stationary circular plate 12 maintains its stopped state. That is, in the initial increment of turn of the movable member 42 and the turnable member 21 from the initial position toward the terminal end position, the stationary circular plate 12 and the reception section 3 are maintained in their stopped states in the folding position.

When the turnable member 21 is turned by 10 degrees from the initial position, the spherical bodies 24A, 24B reach the central parts of the recesses 23A, 23B, respectively, as indicated by the solid lines of FIG. 14. As a result, the turnable member 21 is non-turnably connected to the stationary circular plate 12 by a predetermined retaining force through a connection retaining means 20. Moreover, since the inclination angles a of the-one end side inclination part 23a and the other end side inclination part 23b are set to be larger than the inclination angle β1 of the main inclination surface part 41a of the end face cam 41, the retaining force of the connection retaining means 20 for non-turnably connecting the turnable member 21 and the stationary circular plate 12 to each other is larger than the turn biasing force of the coiled spring 22 converted by the end face cam 41, i.e., turn biasing force for turning the movable member 42 and the turnable member 21. Accordingly, after the turnable member 21 is turned by 10 degrees toward the talking position from the initial position, the stationary circular plate 12 and the turnable member 21 are substantially non-turnably connected to each other, and the turnable member 21 and the stationary circular plate 12 are turned in accordance with the turn of the movable member 42. As a result, the reception section 3 begins to turn from the folding position toward the talking position.

When the movable member 42 and the turnable member 21 are turned by 150 degrees from the initial position, the tip end parts of the abutment arm parts 42a, 42a of the movable member 42 are transferred onto the gentle inclination surface part 41b from the main inclination surface part 41a. Then, since the inclination angle β2 of the gentle inclination surface part 41b is smaller than the inclination angle β1 of the main inclination surface part 41a, the turn biasing force of the coiled spring 22 for the movable member 42 is reduced. As a result, the turning speed of the movable member 42 becomes slow compared with when the abutment arm part 42a is in abutment with the main inclination surface part 41a, and the turning speed of the reception section 3 becomes slow in accordance therewith. When the reception section 3 is turned by 160 degrees from the folding position and reaches the talking position, the reception section 3 is stopped because the stopper is abutted with the transmission section 2. Since the turning speed of the reception section 3 becomes slow at that time, a shock applicable to the reception section 3 when the reception section 3 is stopped is eased.

Because the movable member 42 and the turnable member 21 are already turned by 10 degrees toward the talking position with respect to the reception section 3 and the stationary circular plate 12 immediately after start of the turning motion, when the reception section 3 is turned to the talking position and stopped, the movable member 42 and the turnable member 21 are turned by 170 degrees from the initial position and located in the terminal end position. Accordingly, the terminal end positions of the movable member 42 and the turnable member 21 is in the same position as the talking position of the stationary circular plate 12 (reception section 3). Even after the reception section 3 reaches the talking position, the movable member 42 is still turn biased in a direction toward the talking position from the folding position by the turn biasing force of the coiled spring 22 which is converted by the gentle inclination surface part 41b of the end face cam 41. By this turn biasing force, the stationary circular plate 12 is biased in the same direction through the movable member 42 and the turnable member 21 and the reception section 3 is maintained in the talking position.

The reception section 3, which is already turned to the talking position from the folding position by the coiled spring 22, is manually returned to the folding position. When the reception section 3 is turned toward the folding position, the turnable member 21 and the movable member 42 are turned toward the folding position from the talking position. Then, the tip parts of the abutment arm parts 42a are slid upward along the end face cam 41 toward the starting end. In that case, the abutment arm parts 42a may be arranged in such a manner as to slide upward along only the end face cam 41. In this hinge apparatus 10, however, in order to forcibly turn the reception section 3 toward the folding position by the biasing force of the coiled spring 22 when the reception section 3 reaches a position located before the folding position by a predetermined angle (10 degrees in this embodiment), the abutment arm parts 42a are slid upward along a pair of return inclination surfaces 51a which are formed on a rock member 51, after the abutment arm parts 42a are slid over the gentle inclination surface parts 41b toward the starting end parts of the end face cams 41.

That is, as shown in FIGS. 2, 3, 7 and 9, the lock member 51 has a circular cylindrical configuration and is turnably inserted into the stationary cylinder 11 through the stationary circular plate 12 side. It should be noted, however, that when the movable member 42 is located in the initial position or terminal end position, the lock member 51 is non-turnably connected to the stationary cylinder 11 unless the control button 61, as later described, is depressed. The position of the lock member 51 at that time is a locking position. Moreover, the lock member 51 is non-movable in a direction away from the stationary circular plate 12 when abutted with a partition wall part 11f provided between the enlarged-diameter cylindrical part 11a and the reduced-diameter cylindrical part 11b As shown in FIGS. 7, 9 and 15, a pair of return inclination surfaces 51a, 51a extending in the peripheral direction about the turning axial line L are formed on the end face confronting the movable member 42 of the lock member 51. The return inclination surface 51a is inclined in the same direction as the end face cam 41, and when the lock member 51 is located in the locking position, the rear end edge of the return inclination surface 51a is generally coincident with the rear end edge of the end face cam 41. Moreover, the return inclination surface 51a is inclined at a larger inclination angle γ1 than the inclination angle β1 of the main inclination surface part 41a, and when the return inclination surface 51a is viewed in a direction orthogonal to the turning axial line L, as shown in FIGS. 15(A) and 15(C), the return inclination surface 51a is intersected with the end face cam 41 at a predetermined position in the peripheral direction. In this embodiment, the return inclination surface 51a is intersected with the end face cam 41 at a position 150 degrees away toward the rear end from the starting end edge of the end face cam 41, i.e., at the intersecting part between the main inclination surface part 41a and the gentle inclination surface part 41b. As a result, the return inclination surface 51a is positioned at the lower side of FIG. 15 with respect to the gentle inclination surface part 41b on the rear end side with respect to the intersecting part with the end face cam 41 and positioned at the upper side with respect to the main inclination surface part 41a on the starting end side. Accordingly, when the reception section 3 is turned from the talking position toward the folding position so that the movable member 42 is turned from the terminal end position toward the initial position, the abutment arm part 42a is slid upward along the gentle inclination surface part 41b in the first increment of turn but it is slid upward along the return inclination surface 51a from the position of 150 degrees. When the abutment arm part 42a is slid upward along the return inclination surface 51a, the movable member 42 is turn biased toward the terminal end position by the turn biasing force of the coiled spring 22 converted by the return inclination surface 51a. However, since the inclination angle γ1 of the return inclination surface 51a is set to be smaller than the inclination angles α of the-one end side inclination part 23a and the other end side inclination part 23b, the turnable member 21 and the stationary circular plate 12 are substantially non-turnably connected to each other by the biasing force of the coiled spring 22 without allowing the movable member 42 and the turnable member 21 to turn with respect to the stationary circular plate 12 by the biasing force of the coiled spring 22. Accordingly, when the abutment arm part 42a is slid upward along the return inclination surface 51a against the biasing force of the coiled spring 22, the reception section 3, the stationary circular plate 12, the turnable member 21 and the movable member 42 are turned in unison.

When the reception section 3 is turned about 130 degrees toward the folding position from the talking position, that is, when the reception section 3 is turned to a position about 30 degrees before the folding position, the abutment arm part 42a is climbed on a flat surface 51b formed on the end face of the lock member 51 in such a manner as to be continuous with the return inclination surface 51a. This flat surface 51b is constituted by a plane which forms a right angle between the turning axial line L and itself. Accordingly, during the time the abutment arm part 42a is climbed on the flat surface 51b, the reception section 3 can be kept in its stopping position. The flat surface 51b is not necessarily be formed. A return cam face 51c to be described next may be directly continuous with the return inclination surface 51a.

When the reception section 3 reaches a position 10 degrees before the folding position, the abutment arm part 42a is press contacted with the return cam face 51c which is formed on the end face of the lock member 51 in such a manner as to be continuous with the flat surface 51b. This return cam face 51c is formed as an inclination surface having a descending gradient toward the folding position from the talking position. Accordingly, when the abutment arm part 42a is contacted with the return cam face 51c, the biasing force of the coiled spring 22 is converted to a turn biasing force for turn biasing the movable member 42 toward the folding position from the talking position. By this turn biasing force, the movable member 42 and the turnable member 21 are turned toward the folding position and thus, the stationary circular plate 12 and the reception section 3 are turned toward the folding position. When the reception section 3 reaches the folding position, the reception section 3 and the stationary circular plate 12 are stopped.

If the inclination angle γ2 of the return cam face 51c is equal to or less than the inclination angle α of the-one end side inclination part 23a, the turn biasing force of the coiled spring 22 converted by the return cam face 51c is equal to or less than the retaining force of the connection retaining means 20. Accordingly, when the turnable member 21 is attempted to turn further in a direction toward the folding position from the talking position after the reception section 3 reaches the folding position, turn of the turnable member 21 in the same direction is stopped by the-one end side inclination part 23a of the connection retaining means 20. Thus, when the stationary circular plate 12 and the reception section 3 reach the folding position, the turnable member 21 and the movable member 42 are simultaneously stopped. Actually, however, the inclination angle γ2 is set to be larger than the inclination angle α. Accordingly, the turn biasing force of the coiled spring 22 converted by the return cam face 51c and adapted to act in a direction toward the folding position from the talking position is larger than the retaining force of the connection retaining means 20. For this reason, after the reception section 3 reaches the folding position and the stationary circular plate 12 is stopped, the spherical bodies 24A, 24B are slid upward along the-one end side inclination parts 23a, 23a. The turnable member 21 and the movable member 42 are continuously turned in a direction toward the folding position from the talking position even after the reception section 3 reaches the folding position and is stopped. When the turnable member 21 and the movable member 42 are turned further by 10 degrees toward the initial position from the terminal end position (toward the folding position from the talking position) after the reception section 3 reaches the folding position, the abutment arm part 42a is abutted with the abutment surface 41c. This causes the movable member 42 and the turnable member 21 to stop. The position of the movable member 42 and the turnable member 21 at that time is the initial position. Accordingly, the spherical bodies 24A, 24B are returned to the position indicated by the imaginary line of FIG. 14 at that time. The tip part of the abutment arm part 42a is simultaneously in contact with the abutment surface 41c, the starting end edge of the end face cam 41 and the return cam face 51c.

The lock means 50 is adapted to lock the movable member 42 at the initial position. The lock means 50 includes the lock member 51, a stopper member 52 and a return spring 53. A pair of guide grooves 51d, 51d extending in parallel with the turning axial line L are formed in one end face of the lock member 51 contacting the partition wall surface 11f in such a manner as to be 180 degrees away from each other in the peripheral direction. The inside diameter of the lock member 51 is larger than the diameter of the hinge shaft 13. The inside of the lock member 51 allows the hinge shaft 13 to pass therethrough with an annular gap.

The stopper member 52, as shown in FIGS. 7 and 10, has a circular plate part 52a. This circular plate part 52a is fitted to one end part of the lock member 51 on the partition wall part 11f side such that the circular plate part 52a is turnable and movable in the direction of the turning axial line L. As shown in FIGS. 2 and 3, the central part of the circular plate part 52a allows the hinge shaft 13 to turnably and slidably pass therethrough. A pair of engagement protrusions 52b, 52b are formed on the outer periphery of the circular plate part 52a in such a manner as to be 180 degrees away from each other in the peripheral direction. The respective engagement protrusions 52b are respectively slidably inserted in the guide grooves 51d, 51d of the lock member 51 in the direction of the turning axial line L. Owing to this arrangement, the stopper member 52 is connected to the lock member 51 such that the stopper member 52 is non-turnable but movable in the direction of the turning axial line L.

The respective engagement protrusions 52b, 52b are protruded toward the partition wall part 11f from the circular plate part 52a, and the projected tip ends thereof are inserted in a pair of lock holes 11g,11g passing through the partition wall part 11f such that the engagement protrusion parts 52b, 52b can be brought into and out of the lock holes 11g, 11g, respectively. The pair of lock holes 11g, 11g are symmetrically arranged with reference to the turning axial line L. Accordingly, the engagement protrusions 52b, 52b are engaged with the lock holes 11g, 11g, respectively every time the stopper member 52 is turned by 180 degrees. Moreover, the engagement protrusion part 52b is arranged in such a manner as to be fitted to the lock hole 11g when the movable member 42 is located in the initial position or in the terminal end position. The position of the lock member 51 and the stopper member 52 when the engagement protrusion part 52b is fitted to the lock hole 11g is the locking position. In this locking position, the stopper member 52 and the lock member 51 are non-turnably connected to the stationary cylinder 11. When the engagement protrusion part 52b is escaped from the lock hole 11g, the stopper member 52 and the lock member 51 become turnable with respect to the stationary cylinder 11.

The return spring 53 is composed of a coiled spring. The biasing force of the return spring 53 is set to be much smaller than the biasing force of the coiled spring 22. The return spring 53 is inserted into an annular gap formed between the outer peripheral surface of the hinge shaft 13 and the inner peripheral surface of the lock member 51. One end part of the return spring 53 is in abutment with a stepped surface 13b formed on the outer peripheral surface at the intermediate part of the hinge shaft 13, and the other end part is in abutment with the stopper member 52. Accordingly, the return spring 53 normally biases the stopper member 52 toward the partition wall part 11f. Thus, when the engagement protrusion part 52b is inserted in the lock hole 11g, the engagement protrusion part 52b is kept inserted in the lock hole 11g and the circular plate part 52a is kept abutted with the partition wall part 11c as long as no external force acts on the stopper member 52. When the engagement protrusion part 52b is escaped from the lock hole 11d and the stopper member 52 is turned, the distal end face of the engagement protrusion part 52*b* is slid on the partition wall part 11*f.*

When the lock member 51 is located in the locking position and the movable member 42 is located in the initial position, the movable member 42 is urged in a direction toward the folding position from the talking position by the return cam face 51*c*. However, the movable member 42 is prohibited from turning in the same direction by abutment of the abutment arm part 42*a* with the abutment surface 41*c*. Moreover, the movable member 42 is urged in a direction toward the talking position from the folding position by the coiled spring 22 and the end face cam 41 but prohibited from turning in the same direction by the lock member 51. Accordingly, the movable member 42 is maintained in the initial position without being allowed to turn from the initial position.

When the engagement protrusion part 52*b* of the stopper member 52 is escaped from the lock hole 11*g* in a state that the movable member 42 is located in the initial position, the lock member 51 becomes turnable toward the terminal end position from the initial position. As a result, the movable member 42 is turned toward the terminal end position from the initial position by the turn biasing means 40. When the movable member 42 is turned, the lock member 51 is urged by movable member 42 and turned in the same direction. Since the abutment arm part 42*a* of the movable member 42 is slid down along the return cam face 51*c* at that time, the lock member 51 is caused to additionally turn by a portion equal to the slide-down portion for the abutment arm part 42*a* along the return cam face 51*c* with respect to the movable member 42. On the other hand, since the surface 51*e* continuous with the return cam face 51*c* of the lock member 51 is an inclination surface inclined downward, in FIG. 15, toward the talking position, the turning amount of the lock member 51 becomes smaller than the turning amount of the movable member 42 from the time the movable member 42 is deviated from the return cam face 51*c* to the time the movable member 42 is turned to the terminal end position. The difference in turning amount at that time is equal to the difference in turning amount between the movable member 42 and the lock member 51 caused by the slide-down made by the abutment part 42*a* along the return cam face 51*c*. Accordingly, when the movable member 42 is turned from the initial position to the terminal end position, the lock member 51 is also turned by 170 degrees. Of course, the stopper member 52, which is non-turnably connected to the lock member 51, is also turned by 170 degrees.

As described above, the engagement protrusion parts 52*b*, 52*b* of the stopper member 52 are fitted to the lock holes 11*g*, 11*g* every time the stopper member 52 is turned by 180 degrees. Accordingly, The 170 degrees turn from the initial position made by the movable member 42 is not enough for the engagement protrusion parts 52*b*, 52*b* to enter the lock holes 11*g*, 11g respectively and the lock member 51 cannot be located in the lock position. In view of the foregoing, as shown in FIG. 10(D), of the two side surfaces directing toward the peripheral direction of each engagement protrusion part 52*b*, at least one side surface directing to a direction toward the folding position from the talking position is provided with an inclination surface 52*c* (the inclination surface 52*c* is formed on each side surface of the engagement protrusion part 52*b* in this embodiment) which is inclined toward the talking position from the folding position as it goes toward the distal end side from the basal end side of the engagement protrusion part 52*b*. When this amount of inclination is converted in an angle in the peripheral direction, the inclination surface 52*c* is inclined by an angle which is slightly larger than 10 degrees. Accordingly, when the stopper member 52 is turned by 170 degrees, the distal end part of the inclination surface 52*c* is brought into an opposing relation with one side wall in the peripheral direction of the lock hole 11*g*, i.e., one side wall directing in a direction toward the talking position from the folding position. Thus, when the stopper member 52 is moved toward the partition wall part 11*f* (leftward of FIG. 2) by the return spring 53, the inclination surface 52*c* is abutted with one side wall of the lock hole 11*g*. As a result, the stopper member 52 is turned toward the talking position by 10 degrees while moving leftward in FIG. 2. As a result, the stopper member 52 is located again in the locking position, and the stopper member 52 and the lock member 51 are non-turnably locked to the stationary cylinder 11.

The unlock means 60 is adapted to release the locked state of the movable member 42 with respect to the stationary cylinder 11 caused by the lock means 50, so that the movable member 42 and the turnable member 21 can be turned toward the talking position from the initial position. As shown in FIGS. 2 and 3, the unlock means 60 includes a control button 61. This control button 61, as shown in FIG. 7, comprises a bottomed circular cylindrical main body part 61*a* whose one end part is open and the other end part is provided with a bottom part, and a pair of engagement arm parts 61*b*, 61*b* extending forward from one end face of the main body part 61*a*. After the engagement arm parts 61*b*, 61*b* climb over the stop ring 14 in a state that the interval between their distal end parts is spread by their own elasticity, the engagement arm parts 61*b*, 61*b* are elastically restored and deformed, thereby being mounted on the outer peripheral surface of the left end part of the stationary cylinder 11. In this mounted state, as shown in FIG. 5, the engagement arm part 61*b* is slidably fitted in the lock hole 11*g* formed in the stationary cylinder 11. Owing to this arrangement, the control button 61 is connected to the stationary cylinder 11 such that the control button 61 is movable in the direction of the turning axial line L but non-turnable. Moreover, the engagement arm parts 61*b*, 61*b* are withdrawably engaged in the lock holes 11*g*, 11*g*, respectively. When the lock member 51 is located in the locking position, the distal end face of the engagement arm part 61*b* is in contact with the distal end face of the engagement protrusion part 52*b* of the stopper member 52. Accordingly, the control button 61 is biased leftward, in FIG. 2, by the return spring 53. However, an engagement surface 61*c* formed on the engagement arm part 61*b* is abutted with the stop ring 14, thereby prohibiting the control button 61 from moving leftward.

In the state that the reception section 3 is located in the folding position and the lock member is located in the locking position, when the control button 61 is depressed toward the stationary cylinder 11 until its outer end face is positioned on the generally same plane as the left end face, in FIG. 2, of the connection cylindrical part 2*a*, the engagement protrusion parts 52*b*, 52*b* of the stopper member 52 are pushed by the engagement arm parts 61, 61*b* and escaped from the lock holes 11*g*, 11*g*, respectively. Then, the stopper member 52 and the lock member 51 become turnable in a direction toward the talking position from the folding position, and the movable member 42 and the turnable member 21 are turned toward the talking position from the initial position. When the turnable member 21 is turned by 10 degrees from the initial position, the spherical bodies 24A, 24B are slid down along the-one end side inclination parts 23*a*, 23*a* to the central parts of the cam recesses 23A, 23B, and are brought into contact with the other end side inclination parts 23*b*, 23*b*, respectively. Then, the stationary circular plate 12 and the turnable member 21 begin to turn in unison, and the reception section 3 is turned toward the talking position from the folding position. When the reception section 3 reaches the talking position and stops, the stopper member 52 is pushed by the return spring 53 and the engagement protrusion part 52b is brought into the lock hole 11g. This causes the lock member 51 and the stopper member 52 to be located in the locking position again. The reception section 3 turned to the talking position is manually returned to the folding position as previously mentioned.

In a cellular telephone set incorporated with the hinge apparatus having the above-mentioned construction, presume that the reception section 3 is manually turned to a position within the stoppable range, for example, a position 90 degrees away toward the talking position from the folding position and manually stopped in that position. When the control button 61 is depressed in that state, the movable member 42 and the turnable member 21 are turned toward the terminal end position from the initial position by the turn biasing means 40. In the first increment of turn, the spherical bodies 24A, 24B are slid along the confronting surface with the turnable member 21 of the stationary circular plate 12. Thereafter, when the turnable member 21 is turned about 100 degrees (=10 degrees+90 degrees) from the initial position, the spherical bodies 24A, 24B are slid down along the-one end side inclination parts 23a, 23a of the engagement recesses 23A, 23B and reach the central parts of the engagement recesses 23A, 23B. Then, the spherical bodies 24A, 24B are abutted with the other end side inclination parts 23b, 23b, respectively. As a result, the turnable member 21 is stopped. Thereafter, when the reception section 3 is freely turnable, the stationary circular plate 12 is turned to the talking position in unison with the turnable member 21 and the reception section 3.

As mentioned above, when the control button 61 is depressed in the state that the reception section 3 is manually stopped in a position within the stoppable range, if the spherical bodies 24A, 24B are stopped by the other end side inclination parts 23b, 23b, respectively, there is no problem. However, the spherical bodies 24A, 24B are slid down the-one end side inclination parts 23a, 23a, respectively, before they are abutted with the other end side inclination surface parts 23b, 23b, respectively. For this reason, the turnable member 21 and the movable member 42 are turned toward the talking position at a high speed. Then, there is such a fear that the spherical bodies 24A, 24B are slid upward along the other end side inclination surface parts 23b, 23b of the cam recesses 23A, 23B, respectively, by the inertial force of the turnable member 21 and the movable member 42 and moved over the cam recesses 23A, 23B, respectively. In such a case, after the spherical bodies 24A, 24B are moved over the cam recesses 23A, 23B, respectively, the turnable member 21 is further turned (hereinafter, referred to as "overly turned") in a direction toward the talking position from the folding position with respect to the stationary circular plate 12 by the following angle;

180 degrees−90 degrees=90 degrees

When the turnable member 21 and the movable member 42 are once overly turned, there is no way to eliminate the overly turned portion, and the turnable member 21 and the movable member 42 are maintained in their overly turned states with respect to the stationary circular plate 12. Under such a circumstance, even if the reception section 3 is manually turned to the folding position, the reception section 3 cannot be stopped in the folding position because the abutment arm part 42a of the movable member 42 does not reach the return cam face 51c of the lock member 51.

In order to prevent an occurrence of such inconvenience, in this hinge apparatus 10, a stopper mechanism 70 is provided between the stationary circular plate 12 and the turnable member 21. The stopper mechanism 70 includes abutment protrusions 71, 72 which are formed respectively on the confronting surfaces between the turnable member 21 and the stationary circular plate 12. The abutment protrusions 71, 72 prohibit the turnable member 21 from turning with respect to the stationary circular plate 12 by abutment between the side surfaces of the abutment protrusions 71, 72 directing in the peripheral direction of a circumference about the turning axial line L. As long as the hinge apparatus 10 works normally, they are never abutted with each other. However, when the movable member 42 and the turnable member 21 are turned toward the talking position from the initial position by the turn biasing means 40, if the spherical bodies 24A, 24B tend to turn along the other end side inclination parts 23b, 23b from the central parts of the cam recesses 23A, 23B, respectively, by a predetermined angle or more, they are abutted with each other. In this embodiment, the predetermined angle is a small angle such as, for example, 5 degrees or less. At the most, the predetermined angle is set to be smaller than the angle corresponding to the length in the peripheral direction of the other end side inclination part 23b. Accordingly, even if the spherical bodies 24A, 24B successfully climb over the central parts of the cam recesses 23A, 23B, respectively, they cannot climb over the other end side inclination parts 23b, 23b. The turnable member 21 is stopped before the spherical bodies 24A, 24B climb over the other end side inclination parts 23b, 23b. When the turnable member 21 is stopped in a state that the spherical bodies 24A, 24B are in contact with the other end side inclination parts 23b, 23b, respectively, the spherical bodies 24A, 24B are returned to the central parts of the cam recesses 23A, 23B by the other end side inclination parts 23b, 23b, respectively. Accordingly, the hinge apparatus 10 maintains its normal condition.

The cover cylinder 15 is externally fitted to the stationary cylindrical part 11 at its area ranging from the central part to the turnable member 21. This cover cylinder 15 is adapted to prevent a lubricating oil, which is applied to the end face cam 41, between the cylindrical parts 21a, 42b mutually fitted, etc., from leaking outside.

Next, a method for assembling the hinge apparatus 10 having the above-mentioned construction to the cellular telephone set 1 will be described. At the time for assembling the hinge apparatus 10 to the cellular telephone set 1, as shown in FIG. 4, the movable member 42 is turned toward the talking position from the initial position by 180 degrees so that the abutment arm part 42a is abutted with the wall surface of the recess 11e of the stationary cylinder 11. In that state, the stationary circular plate 12 is located in a position 170 degrees away from the folding position. Then, the hinge apparatus 10 is inserted into the first connection hole 2c through the opening part on the second connection hole 3c side. The hinge apparatus 10 is inserted into the first connection hole 2c first with the control button 61. The hinge apparatus 10 is inserted into the first connection hole 2c until the stationary cylinder 11 is abutted with the abutment surface 2g formed on the inner peripheral surface of the connection cylindrical part 2a through the cover cylinder 15. In that state, a part of the main body part 61a of the button 61 is protruded from the reduced-diameter hole part 2e of the first connection hole 2c, and the entire stationary circular plate 12 is protruded outside from the first connection hole 2c. Thereafter, the stationary circular plate 12 is moved toward the stationary cylinder 11 against the biasing force of the coiled spring 22 and the entire stationary circular plate 12 is inserted into the first connection hole 2c. At that time, the hinge shaft 13 is also moved in unison with the stationary circular plate 12 and the entire hinge shaft 13 is also inserted into the first connection hole 2c. Then, the connection shaft part 3a is moved in a direction as indicated by the arrow of FIG. 4 so that the axis of the second connection hole 3c is aligned with that of the first connection hole 2c. And the reception section 3 is properly turned so that the second connection hole 3c and the stationary circular plate 12 are phase matched (phase matching between a key part 2f and a key groove 11c) in the peripheral direction. When the axes of the second connection hole 3c and the first connection hole 2c are aligned and the second connection hole 3c and the stationary circular plate 12 are phase matched in the peripheral direction, the stationary circular plate 12 biased by the coiled spring 22 is fitted into the first connection hole 3c. By doing so, the operation for assembling the hinge apparatus 10 to the cellular telephone set 1 is finished. Thereafter, the reception section 3 is turned from the talking position to the folding position. Normally, the reception section 3 is located in the folding position. In that state, a stopper for positioning the talking position is mounted on the transmission section 2 or the reception section 3. By doing so, the operation for connecting the transmission section 2 and the reception section 3 together through the hinge apparatus 10 is finished.

It should be noted that the present invention should not be limited to the above-mentioned embodiment but many changes and modifications can properly be made in accordance with necessity.

For example, in the above-mentioned embodiment, the hinge apparatus according to the present invention is applied to the cellular telephone set 1. However, the hinge apparatus 10 can also be used as a hinge apparatus for turnably connecting a main body part and a liquid crystal display part of a notebook type personal computer.

Moreover, in the above-mentioned embodiment, the return inclination surface 51a, the flat surface 51b and the return cam face 51c are formed on the lock member 51, and at the time for returning the reception section 3 automatically turned to the talking position to the folding position, the abutment arm part 42a of the movable member 42 is contacted with the return inclination surface 51a, the flat surface 51b and the return cam face 51c. However, it is also accepted that the abutment arm part 42a is contacted with the end face cam 41 at that time.

Moreover, in the above-mentioned embodiment, the stationary circular plate 12 and the turnable member 21 are integrated by a retaining force of the connection retaining means 20 larger than the turn biasing force of the coiled spring 22. By doing so, the turn biasing force acting on the movable member 42 is transmitted to the stationary circular plate 12 through the turnable member 21. However, in case there is no need for manually turning the stationary circular plate (second hinge member) 12 toward the talking position from the folding position with respect to the stationary cylinder (first hinge member) 1, the turnable member 21 may be integrally formed with the stationary circular plate 12. In other words, the movable member 42 may be non-turnably connected directly to the stationary circular plate 12 by eliminating a provision of the turnable member 21. Moreover, in case the stationary circular plate 12 can be moved in a direction of the turning axial line L in unison wit the movable member 42, the movable member 42 may be integrally formed with the stationary circular plate 12.

Moreover, in the above-mentioned embodiment, a pair of end face cams 41 and a pair of raised wall surfaces 11d are formed on the confronting surface with the movable member 42 of the stationary cylinder 11. However, the numbers of the end face cams 41 and the raised wall surfaces 11d may be three or more. Three or more of the end face cams 41 and the raised wall surfaces 11d are equally spacedly arranged in the peripheral direction about the turning axial line L. The number of the abutment arm parts 42a to be formed is also equal to the number of the end face cams 41. The same is applicable when the abutment part is formed on the stationary cylinder 11 and the end face cam is formed on the movable member 42.

INDUSTRIAL APPLICABILITY

A hinge apparatus according to the present invention can be utilized as a hinge apparatus for connecting, for example, a transmission section and a reception section of a cellular telephone set or a main body and a display unit of a notebook type personal computer, and particularly as a hinge apparatus in which a large turning range is required.

BRIEF DESCRIPTION OF DRAWINGS

FIG. 1 is a view showing a cellular telephone set in which a hinge apparatus according to the present invention is used and which is opened in a talking position.

FIG. 2(A) is an enlarged sectional view taken on line X-X of FIG. 1(A) and FIG. 2(B) is a sectional view taken on line B-B of FIG. 2(A).

Figures 3A, 3B:
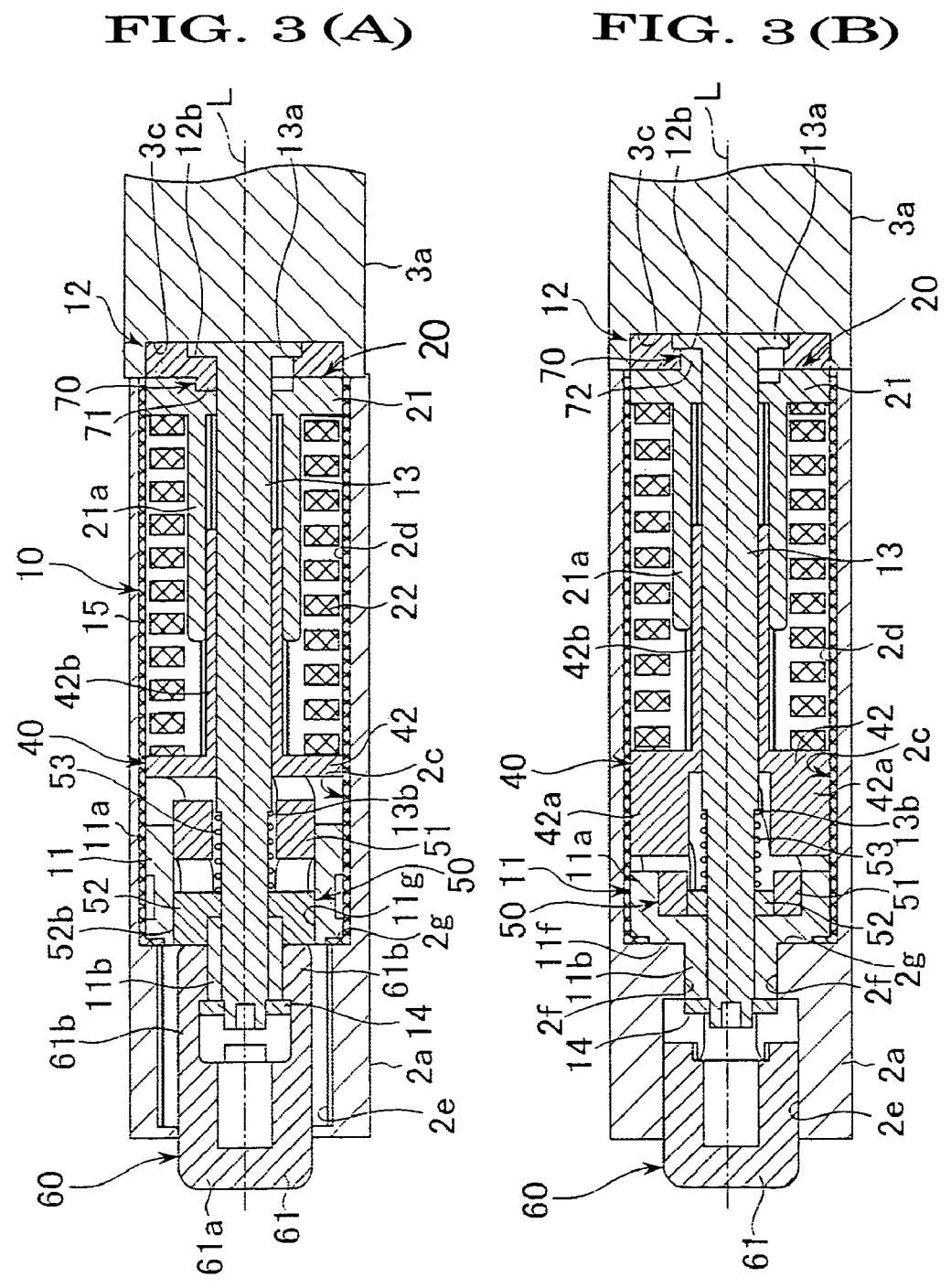

FIG. 3 is a view showing the hinge apparatus, in which the stationary circular plate is located in a talking position, FIGS. 3(A) and 3(B) are sectional views like in FIGS. 2(A) and 2(B).

FIG. 8 is a view showing a stationary cylinder used in the hinge apparatus.

FIG. 9 is a view showing a lock member used in the hinge apparatus.

FIG. 10 is a view showing a stopper member used in the hinge apparatus.

FIG. 11 is a view showing a movable member used in the hinge apparatus.

FIG. 12 is a view showing a turnable member used in the hinge apparatus.

FIG. 13 is a view showing a stationary circular plate used in the hinge apparatus.

DESCRIPTION OF REFERENCE NUMERALS

Figure 1A:
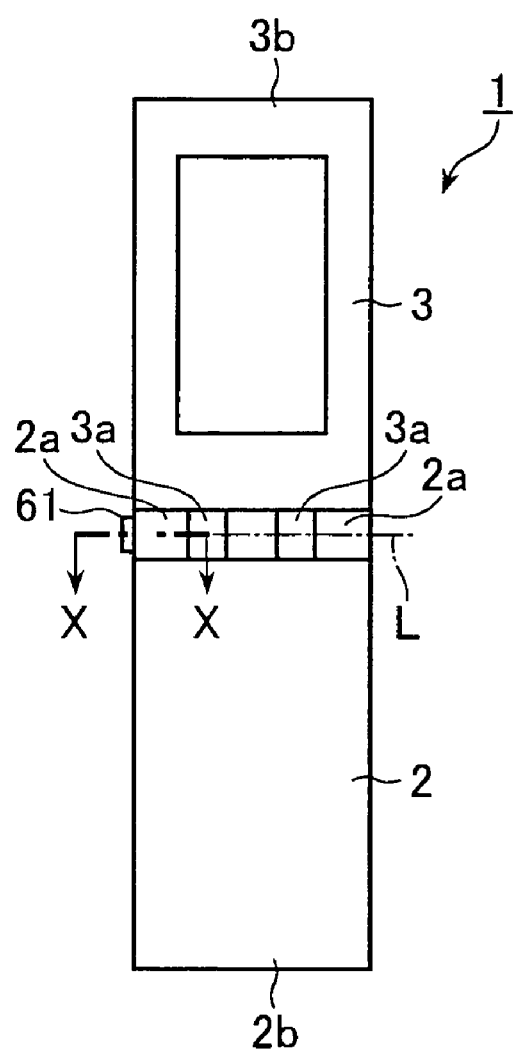
FIG. 1(A) is its front view and FIG. 1(B) is its side view.
Figure 1B:
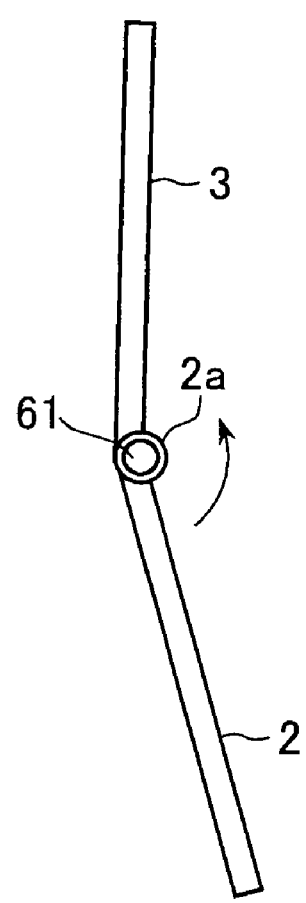
Figure 2:
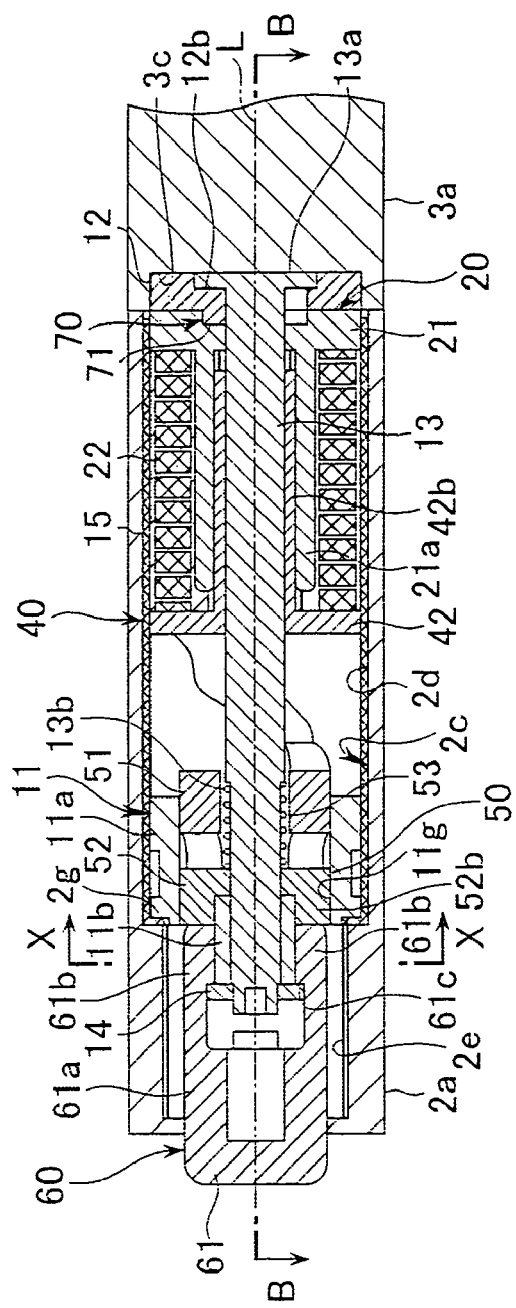
FIG. 2 is a view showing a hinge apparatus according to the present invention, in which a stationary circular plate is located in a folding position.
Figure 2:
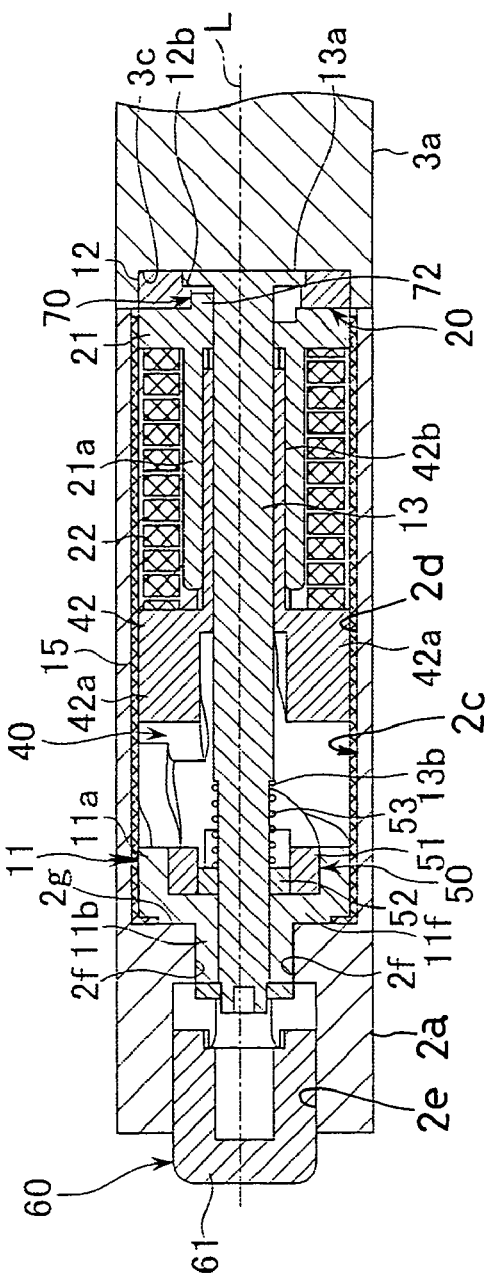
Figure 4:
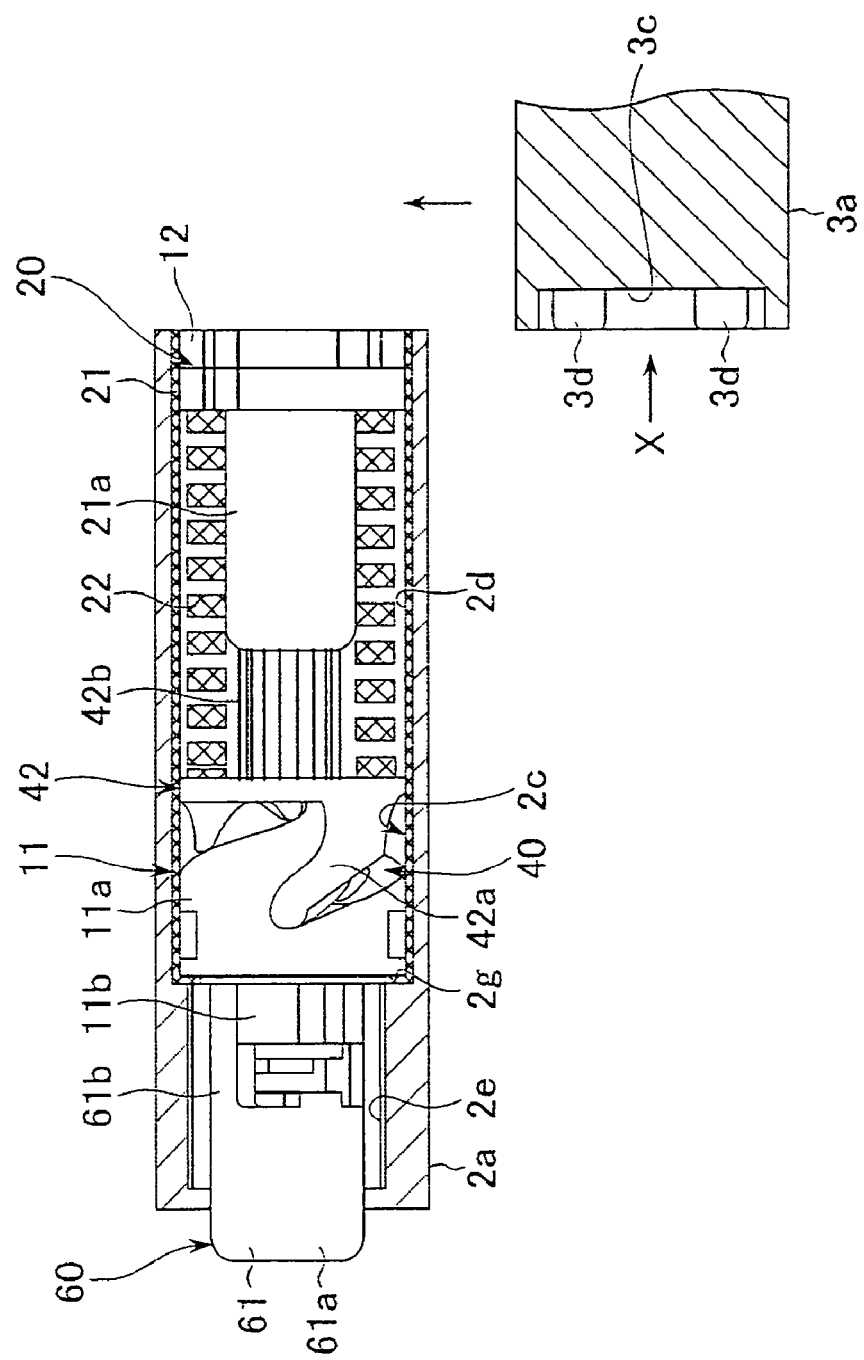
FIG. 4 is a sectional view for explaining a method for assembling the hinge apparatus in a cellular telephone set.
Figure 5:
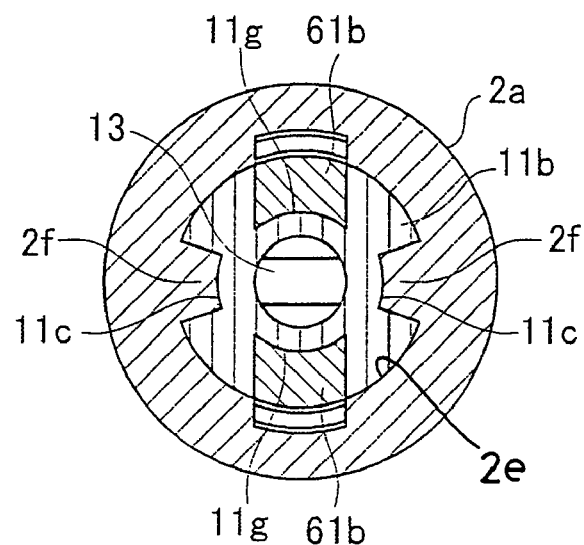
FIG. 5 is an enlarged sectional view taken on line X-X of FIG. 2.
Figure 6:
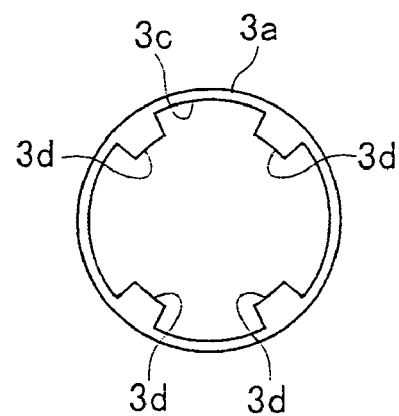
FIG. 6 is a view when viewed in a direction as indicated by an arrow X of FIG. 4.
Figure 7:
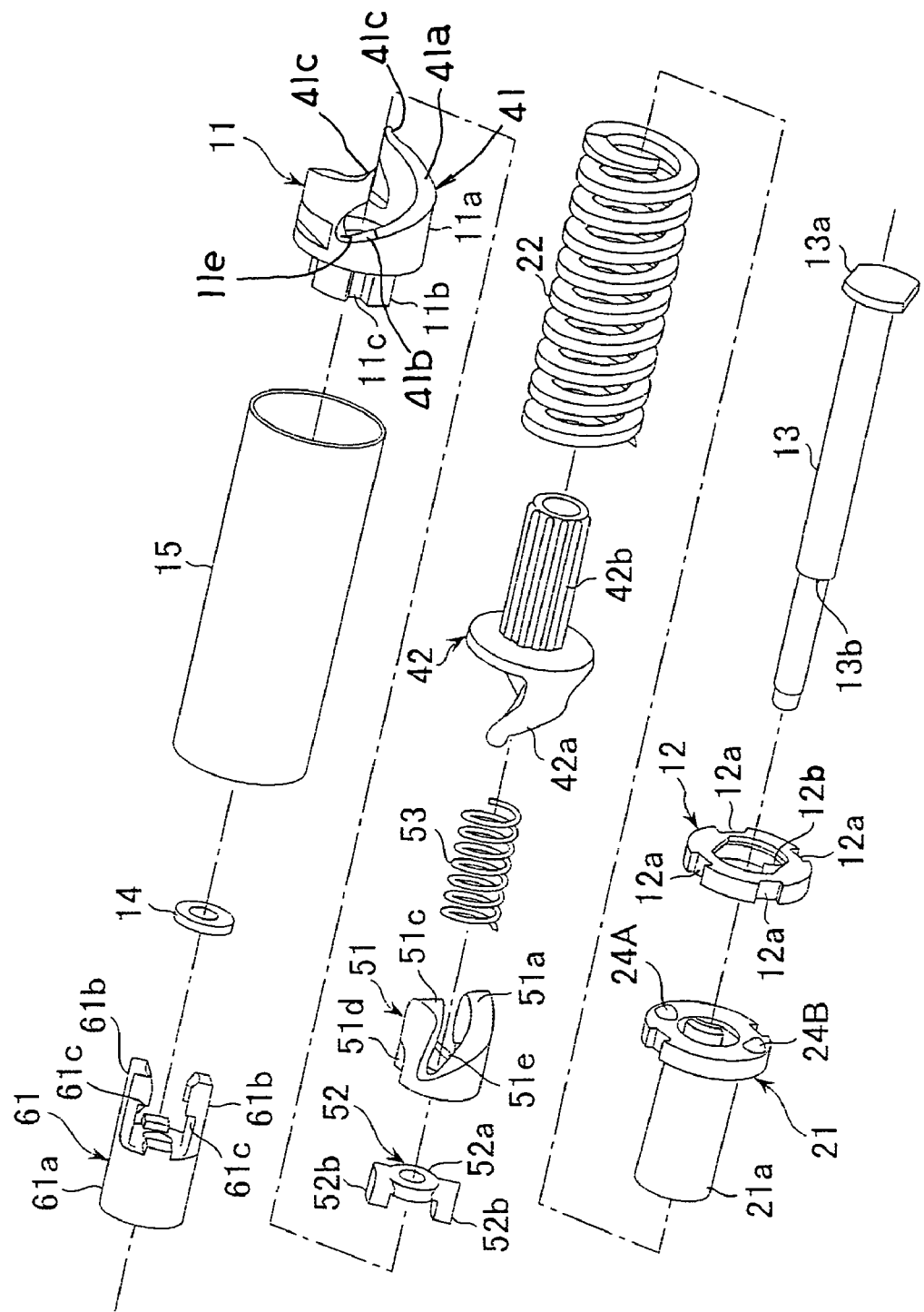
FIG. 7 is an exploded perspective view of the hinge apparatus.
Figure 8A:
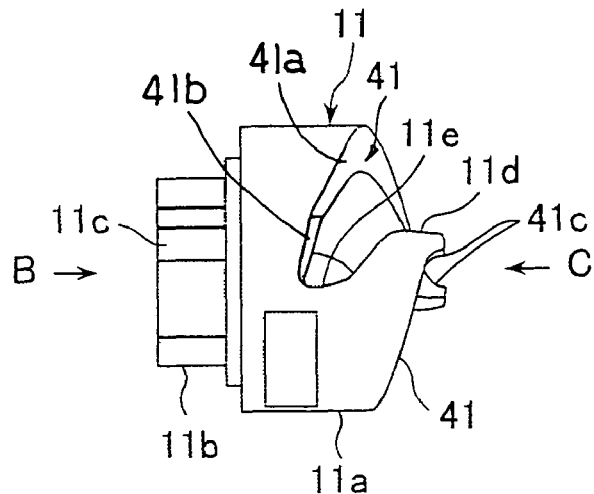
FIG. 8(A) is its side view.
Figure 8B:
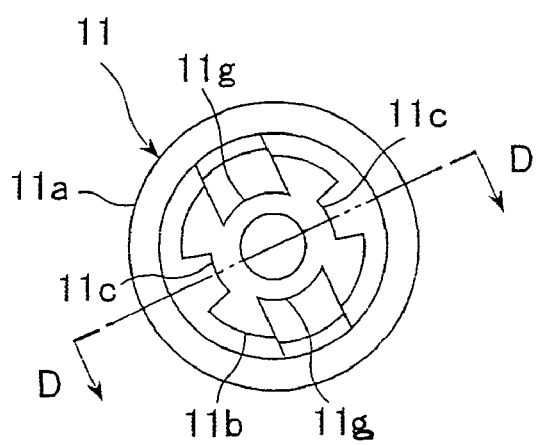
FIG. 8(B) is a view when viewed in a direction as indicated by an arrow B of FIG. 8(A)
Figure 8C:
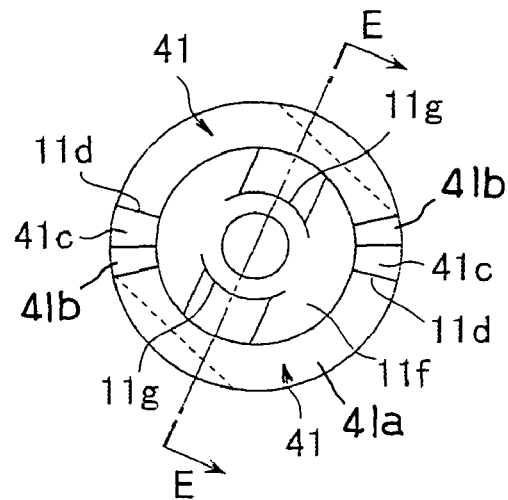
FIG. 8(C) is a view when viewed in a direction as indicated by an arrow C of FIG. 8(A)
Figure 8D:
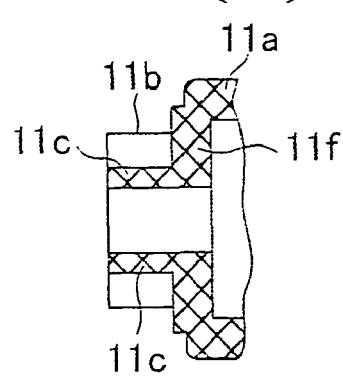
FIG. 8(D) is a sectional view, partly omitted, taken on line D-D of FIG. 8(B)
Figure 8E:
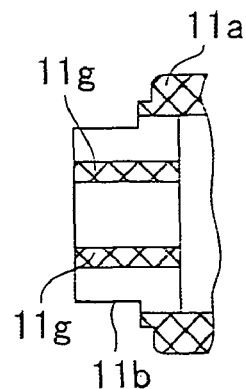
FIG. 8(E) is a sectional view, partly omitted, taken on line E-E of FIG. 8(C).
Figure 9A:
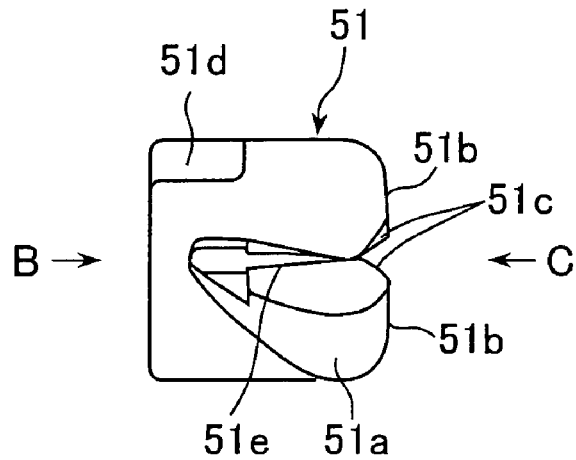
FIG. 9(A) is its side view.
Figure 9B:
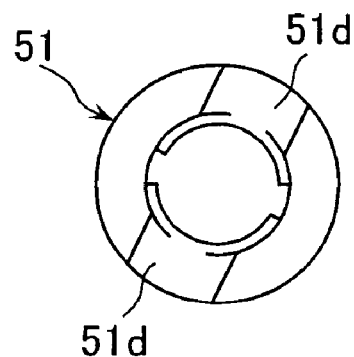
FIGS. 9(B) and 9(C) are views when viewed in a direction as indicated by arrows B and C of FIG. 9(A), respectively.
Figure 9C:
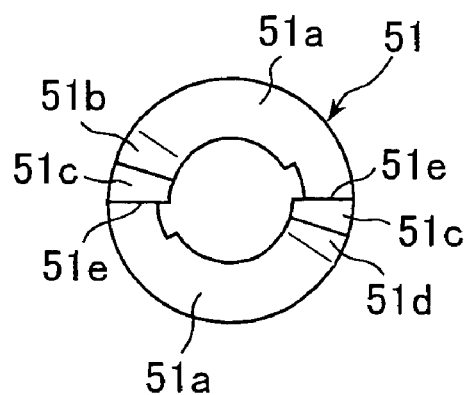
Figure 10A:
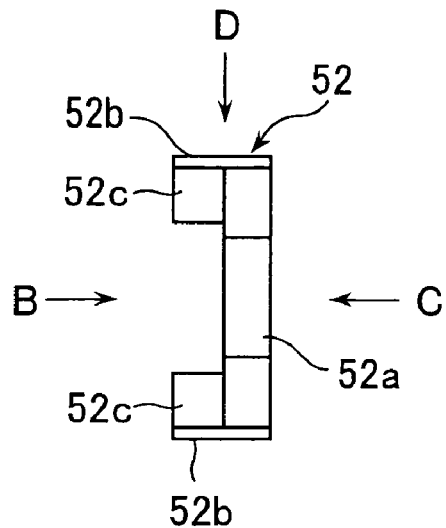
FIG. 10(A) is its side view.
Figure 10B:
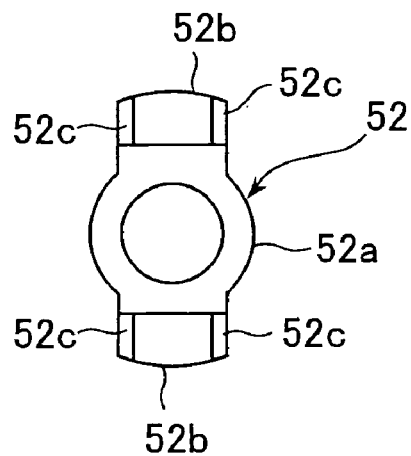
FIGS. 10(B), 10(C) and 10(D) are views when viewed in a direction as indicated by arrows B, C and D of FIG. 10(A), respectively.
Figure 10C:
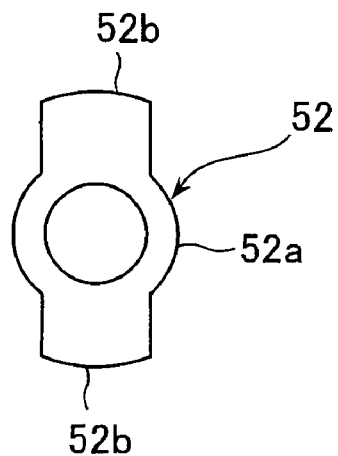
Figure 10D:
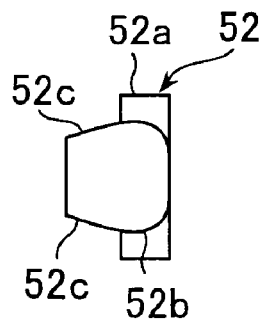
Figure 11A:
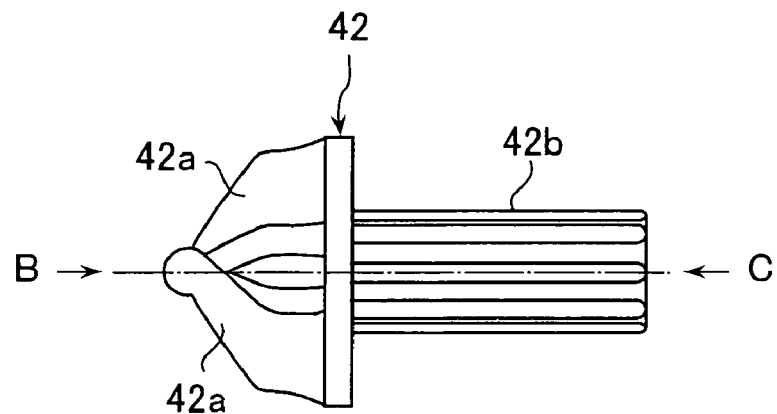
FIG. 11(A) is its side view.
Figure 11B:
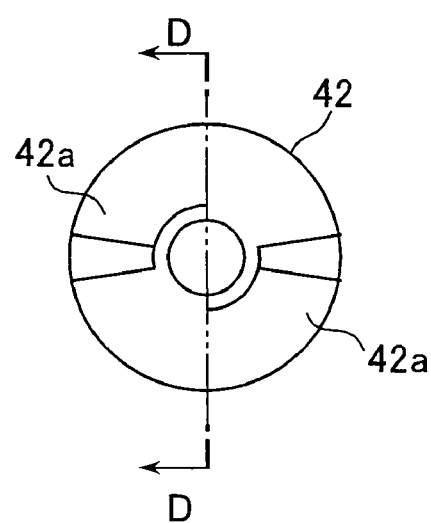
FIGS. 11(B) and 11(C) are views when viewed in a direction as indicated by arrows B and C of FIG. 11(A)
Figure 11C:
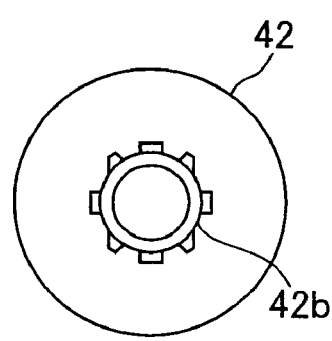
Figure 11D:
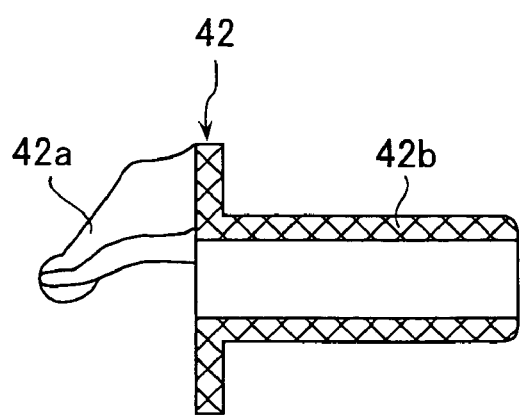
FIG. 11(D) is a sectional view taken on line D-D of FIG. 11(B).
Figure 12A:
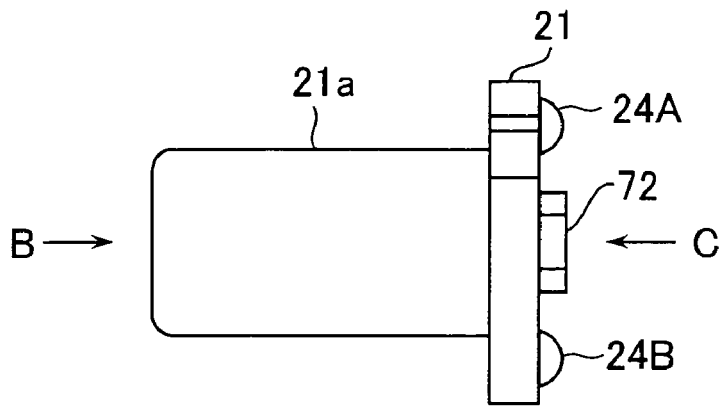
FIG. 12(A) is its side view.
Figure 12B:
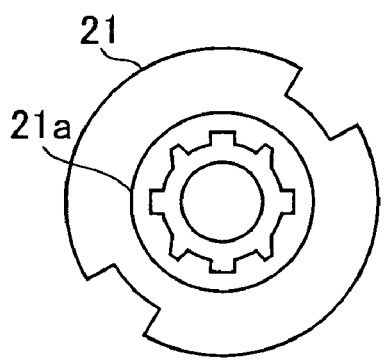
FIGS. 12(B) and 12(C) are views when viewed in a direction as indicated by arrows B and C of FIG. 12(A), respectively.
Figure 12C:
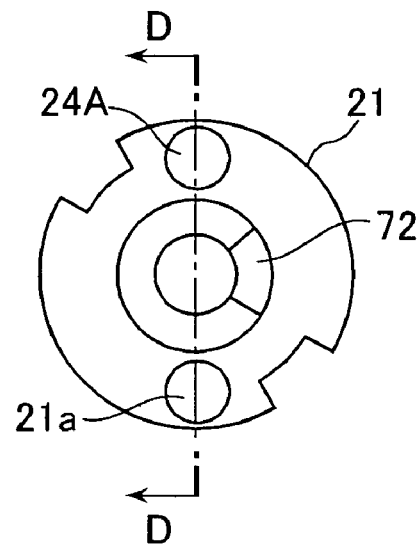
Figure 12D:
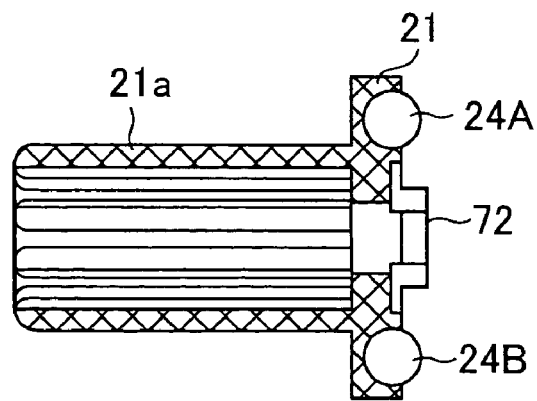
FIG. 12(D) is a sectional view taken on line D-D of FIG. 12(C).
Figure 13A:
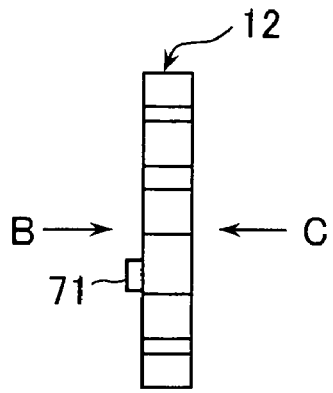
FIG. 13(A) is its side view.
Figure 13B:
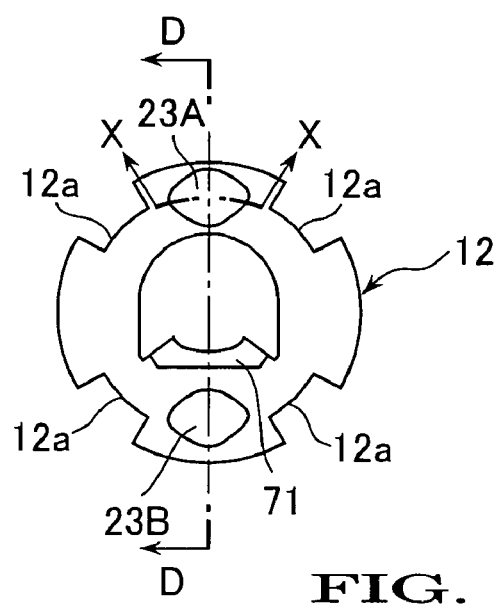
FIGS. 13(B) and 13(C) are views when viewed in a direction as indicated by arrows B and C, respectively.
Figure 13C:
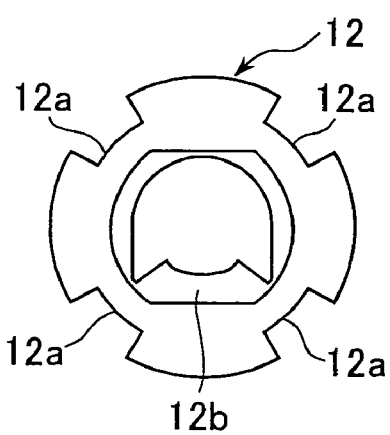
Figure 13D:
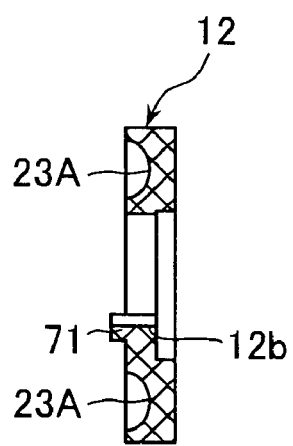
FIG. 13(D) is a sectional view taken on line D-D of FIG. 13(B).
Figure 14:
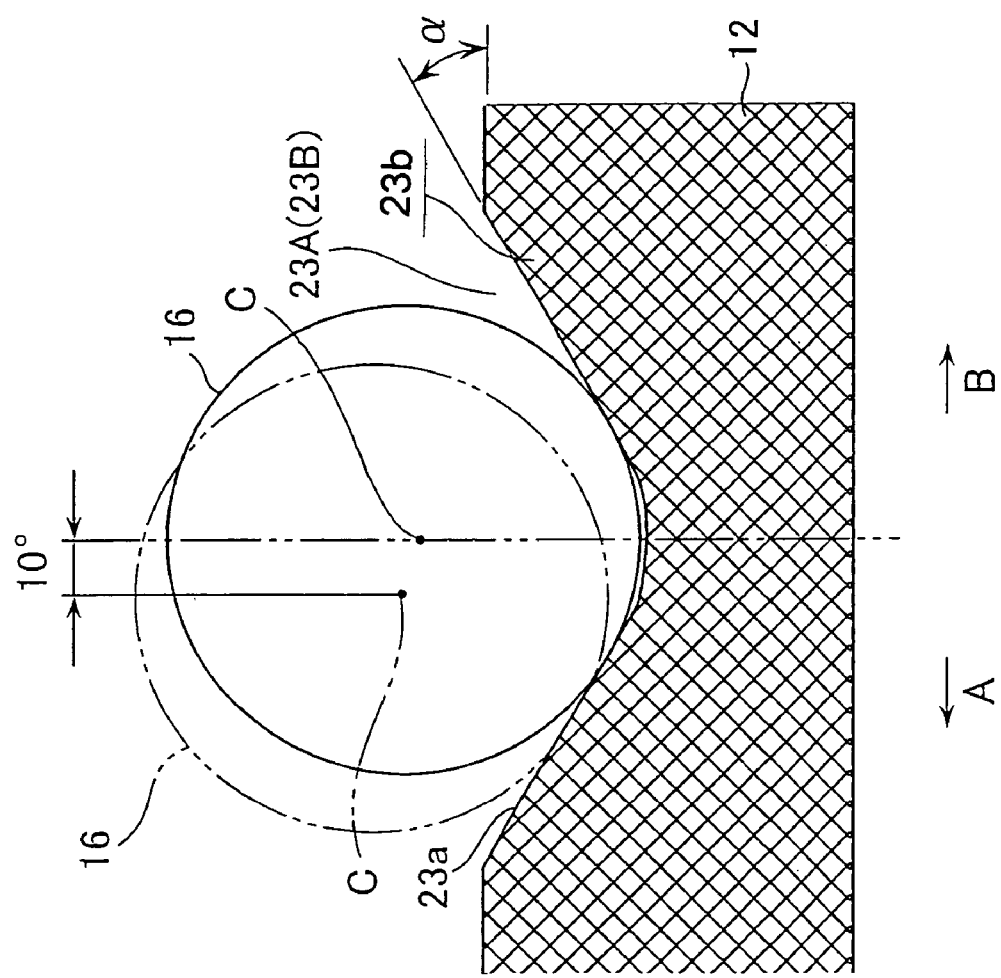
FIG. 14 is an enlarged sectional view taken on line X-X of FIG. 13 showing a relation between a cam recess and a spherical body.
Figure 15:
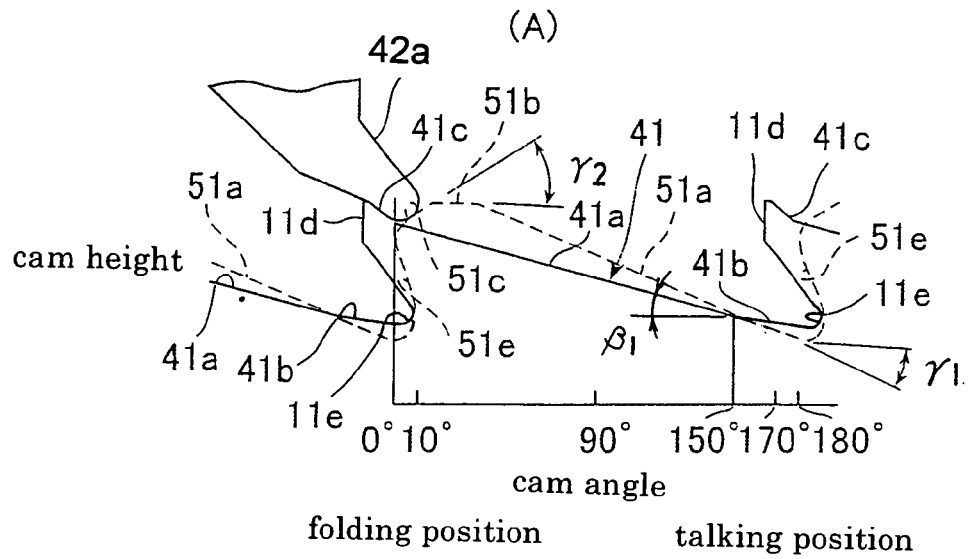
FIG. 15 is a cam diagram showing a relation among an end face cam of the stationary cylinder, an abutment arm of the movable member, and a return inclination surface, a flat surface and a return cam face of the lock member.
Figure 15:
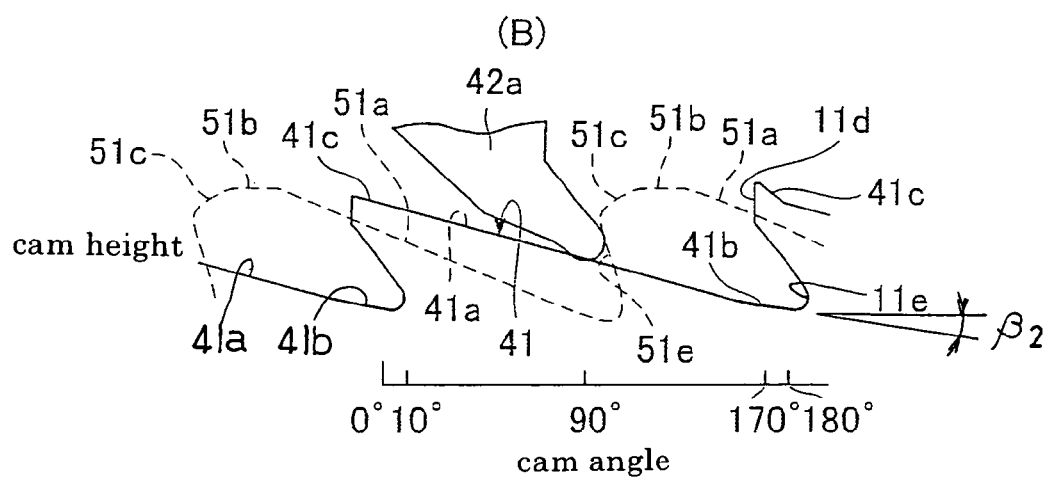
Figure 15:
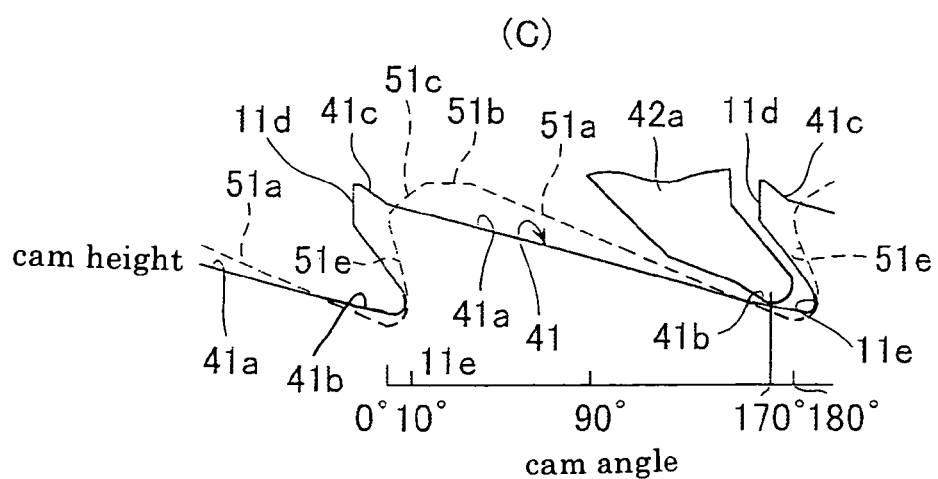

L . . . turning axial line
10 . . . hinge apparatus
11 . . . stationary cylinder (first hinge member)
11d. . . raised wall surface
11e . . . recess
12 . . . stationary circular plate (second hinge member)
22 . . . coiled spring (biasing means)
41 . . . end face cam
42 . . . movable member
42a. . . abutment arm part (abutment part)

The invention claimed is:

1. A hinge apparatus comprising:
a first hinge member,
a second hinge member turnably connected to said first hinge member,
a movable member arranged on a turning axial line of said first and second hinge members in such a manner as to be turnable about the turning axial line and movable in the direction of the turning axial line, and
a biasing means adapted to bias said movable member toward said first hinge member,
said first hinge member and said movable member having confronting surfaces, wherein
one of said confronting surfaces is provided with a plurality of end face cam surfaces extending in a peripheral direction about the turning axial line and equally spacedly arranged in the peripheral direction about the turning axial line, and a raised wall surface disposed between two of said end face cam surfaces which are adjacent in the peripheral direction, a distal end portion of said raised wall surface extending toward the other of said confronting surfaces in the direction of the turning axial line, the other of said confronting surfaces being provided with a plurality of abutment parts being urged against said plurality of end face cam surfaces by the biasing force of said biasing means and adapted to co-act with said plurality of end face cam surfaces to convert the biasing force of said biasing means to a turn biasing force for turning said second hinge member through said movable member, a recess being formed in a basal end portion of said raised wall surface, said basal end portion located spacedly from said other of said confronting surfaces, said recess located at the intersection of said basal end portion of said raised wall surface and said end face cam surface so as to extend into said raised wall surface in the peripheral direction about said turning axial line and arranged on an extension of said end face cam surface, said raised wall surface being located between said recess and the other of said confronting surfaces in the direction of said turning axial line.

2. A hinge apparatus according to claim 1, wherein one side surface of said recess forms a part of said end face cam surface.

3. A hinge apparatus according to claim 2, wherein said end face cam surface has a length of 180 degrees or more in the peripheral direction.

* * * * *